(12) United States Patent
Yamamoto et al.

(10) Patent No.: US 8,190,104 B2
(45) Date of Patent: May 29, 2012

(54) MIMO ANTENNA APPARATUS CHANGING ANTENNA ELEMENTS BASED ON TRANSMISSION CAPACITY

(75) Inventors: Atsushi Yamamoto, Kyoto (JP); Hiroshi Iwai, Osaka (JP); Tsutomu Sakata, Osaka (JP); Yoshio Koyanagi, Ishikawa (JP); Toshiteru Hayashi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 792 days.

(21) Appl. No.: 12/361,770

(22) Filed: Jan. 29, 2009

(65) Prior Publication Data

US 2009/0196371 A1 Aug. 6, 2009

(30) Foreign Application Priority Data

Jan. 29, 2008 (JP) ................................. 2008-017538

(51) Int. Cl.
 *H04B 1/44* (2006.01)
(52) U.S. Cl. ...................... 455/101; 455/562.1; 375/267
(58) Field of Classification Search .................... 455/73, 455/550.1, 562.1, 101, 102, 133, 134, 277.1, 455/277.2; 375/267, 347; 343/702, 750
See application file for complete search history.

(56) References Cited

U.S. PATENT DOCUMENTS

| | | | |
|---|---|---|---|
| 2005/0085196 A1* | 4/2005 | Amano | 455/101 |
| 2010/0009638 A1* | 1/2010 | Saito | 455/73 |
| 2011/0254749 A1* | 10/2011 | Amari et al. | 343/750 |

FOREIGN PATENT DOCUMENTS

| | | |
|---|---|---|
| JP | 2004-40554 | 2/2004 |
| JP | 2004-289407 | 10/2004 |

* cited by examiner

*Primary Examiner* — Thanh Le
(74) *Attorney, Agent, or Firm* — Wenderoth, Lind & Ponack, L.L.P.

(57) ABSTRACT

A controller of a MIMO antenna apparatus calculates a current transmission capacity based on signal levels detected by a signal level detector circuit. The controller calculates an estimated transmission capacity assuming that at least one of antenna elements currently connected to a MIMO modulator and demodulator circuit is changed to a further antenna element not connected to the MIMO modulator and demodulator circuit, based on the detected signal levels and degrees of electromagnetic coupling stored in a degree-of-coupling memory. The controller controls a switch circuit to connect the further antenna element to the MIMO modulator and demodulator circuit when the current transmission capacity becomes lower than the estimated transmission capacity.

19 Claims, 12 Drawing Sheets

MIMO ANTENNA APPARATUS CHANGING ANTENNA ELEMENTS BASED ON TRANSMISSION CAPACITY

BACKGROUND OF THE INVENTION

1. Field of the Invention

The present invention relates to an antenna apparatus for use in a wireless communication apparatus that operates in mobile communication using a mobile phone, etc. so as to increase communication capacity, achieve high-speed communication, as well as maintain high communication quality. More particularly, the present invention relates to a MIMO antenna apparatus, and a wireless communication apparatus provided with the MIMO antenna apparatus.

2. Description of the Related Art

An antenna apparatus disclosed in Patent Document 1 and an adaptive array wireless apparatus disclosed in Patent Document 2 have been known as antenna apparatuses each using a plurality of antenna elements and selectively changing them (diversity antenna apparatuses).

The antenna apparatus disclosed in Patent Document 1 is provided with an antenna element for transmitting and receiving radio waves. The antenna element has a first feed position and a first ground position at a certain part, and a second feed position and a second ground position at another part. The antenna element is further provided with switching means for switching, during feeding to the antenna element, between the feeding by grounding at the first ground position and feeding through the first feed position, and the feeding by grounding at the second ground position and feeding through the second feed position. Particularly, the antenna apparatus configured as an antenna part of a mobile phone is provided with an antenna element serving as a rod element with the configuration and function of an inverted-F antenna. The rod element has a first feed position and a first ground position at one end thereof, and has a second feed position and a second ground position at the other end thereof. A switch unit (switching means) switches between the two feed positions, for feeding the rod element. The antenna apparatus implements a function as two antennas with different directional characteristics, by switching between the two feed positions through the switch unit. According to the antenna apparatus disclosed in Patent Document 1, it is possible to reduce the antenna size, and to provide a diversity antenna capable of improving a diversity effect by switching between two feed positions on an antenna element of a rod element for changing radiation directivity.

Furthermore, the adaptive array wireless apparatus disclosed in Patent Document 2 has an array antenna including a group of three or more antennas. The adaptive array wireless apparatus includes: antenna selecting means for selecting a combination of two antennas from among the group of antennas according to an antenna selection signal; two signal receiving means for performing certain radio signal processing on signals received by the selected combination of antennas; adaptive array signal processing means for performing an adaptive array receiving process on the signals subjected to the radio signal processing by the signal receiving means, and extracting a desired signal; antenna selection controlling means for controlling the antenna selection signal to change a combination of two antennas to be selected by the antenna selecting means; correlation value estimating means for estimating and recording an antenna correlation value of the signals subjected to the radio signal processing by the signal receiving means, for each combination of two antennas selected by the antenna selecting means; and antenna combination determining means for determining a combination of two antennas with the minimum antenna correlation value, and causing the antenna selection controlling means to select the determined combination of two antennas. Thus, an improvement in adaptive array receiving performance can be achieved without providing additional signal receiving means. That is, according to the configuration disclosed in Patent Document 2, an adaptive antenna is implemented, including two signal receiving means and controlling the switching among antennas. Accordingly, both low power consumption and a small size can be achieved.

(1) Patent Document 1: Japanese Patent Laid-Open Publication No. 2004-40554, and (2) Patent Document 2: Japanese Patent Laid-Open Publication No. 2004-289407.

On the other hand, there are antenna apparatuses that adopt MIMO (Multi-Input Multi-Output) technique for transmitting and receiving radio signals of a plurality of channels simultaneously by using a plurality of antennas.

When using the antenna apparatuses disclosed in Patent Documents 1 and 2 as MIMO antenna apparatuses, the following problems arise.

The diversity antenna disclosed in Patent Document 1 is configured to detect only the magnitudes of the received signals and select the feed position with a higher received power, in order to obtain as high received power as possible. However, in MIMO antenna apparatuses, even when received radio signals have high received powers, if there are large differences among the received powers, a MIMO demodulation result degrades. Furthermore, in MIMO antenna apparatuses, when the correlation coefficients between antennas are high as much as one, MIMO demodulation cannot be achieved. That is, in MIMO antenna apparatuses, it is extremely difficult to improve MIMO demodulation performance by performing antenna selection based on received powers only.

On the other hand, the adaptive array wireless apparatus disclosed in the Patent Document 2, that selects two antennas from among the plurality of antennas, is configured to select antennas to be connected to a demodulator circuit, according to only the correlation coefficients between the antennas, in order to improve an interference wave suppression effect. However, since MIMO antenna apparatuses use a technique of spatially multiplexing a plurality of signals for implementing high-speed wireless communication, they require not only low correlation coefficients between antennas, but also high received powers to achieve low error rate. Namely, it is extremely difficult to improve MIMO demodulation performance by performing antenna selection based on correlation coefficients only.

SUMMARY OF THE INVENTION

An object of the present invention is to solve the above-described problems, and provide a MIMO antenna apparatus in a small size, capable of maintaining receiving conditions in which radio signals respectively received by a plurality of antenna elements have high received powers, with small differences among the received powers, and with low electromagnetic coupling, thus achieving MIMO communication with high transmission capacity and high transmission quality, and provide a mobile wireless communication apparatus provided with the MIMO antenna apparatus.

According to the first aspect of the present invention, a MIMO antenna apparatus is provided, which is provided with at least three antenna elements for respectively receiving radio signals, and a demodulator circuit for demodulating radio signals received through at least two of the antenna elements by using a MIMO (Multi-Input Multi-Output) scheme. The apparatus is further provided with: a detector circuit for detecting received-signal levels of the respective radio signals received by the respective antenna elements; a switch circuit for connecting at least two of the antenna elements to the demodulator circuit; a degree-of-coupling memory for storing, in advance, degrees of electromagnetic coupling among the at least three antenna elements; and a controller for controlling the switch circuit based on the received-signal levels detected by the detector circuit and the degrees of electromagnetic coupling stored in the degree-of-coupling memory. The controller calculates a current transmission capacity based on the received-signal levels detected by the detector circuit; calculates an estimated transmission capacity assuming that at least one of the antenna elements currently connected to the demodulator circuit is changed to a further antenna element not connected to the demodulator circuit, based on the received-signal levels detected by the detector circuit and the degrees of electromagnetic coupling stored in the degree-of-coupling memory; and when the current transmission capacity becomes lower than the estimated transmission capacity, controls the switch circuit to connect the further antenna element to the demodulator circuit.

In the MIMO antenna apparatus, the at least three antenna elements include one auxiliary antenna element that is not connected to the demodulator circuit in an initial state thereof. The controller calculates an estimated transmission capacity assuming that any one of the antenna elements currently connected to the demodulator circuit is changed to the auxiliary antenna element; and when the current transmission capacity becomes lower than the estimated transmission capacity, controls the switch circuit to connect the auxiliary antenna element to the demodulator circuit.

Moreover, in the MIMO antenna apparatus, the at least three antenna elements include at least two different types of antenna elements.

Further, in the MIMO antenna apparatus, the at least three antenna elements include a monopole antenna and a slot antenna.

Furthermore, in the MIMO antenna apparatus, two of the at least three antenna elements, that are most distanced from each other, are monopole antennas, and the other antenna element is a slot antenna.

Moreover, in the MIMO antenna apparatus, two of the at least three antenna elements, that are most distanced from each other, are slot antennas, and the other antenna element is a monopole antenna.

Further, the MIMO antenna apparatus is provided with at least four antenna elements. The inner antenna elements, located between two of the at least four antenna elements that are most distanced from each other, include at least two different types of antenna elements.

Furthermore, in the MIMO antenna apparatus, the inner antenna elements include a monopole antenna and a slot antenna.

Moreover, in the MIMO antenna apparatus, when turning on the power to the MIMO antenna apparatus, or when starting MIMO communication, the controller controls the switch circuit to connect two of the at least three antenna elements, that are most distanced from each other, to the demodulator circuit.

Further, in the MIMO antenna apparatus, when turning on the power to the MIMO antenna apparatus, on or when starting MIMO communication, the controller calculates estimated transmission capacities for all possible combinations of antenna elements to be connected to the demodulator circuit, based on the received-signal levels detected by the detector circuit and the degrees of electromagnetic coupling stored in the degree-of-coupling memory; selects a combination of antenna elements achieving the highest transmission capacity; and controls the switch circuit to connect the selected combination of antenna elements to the demodulator circuit.

Furthermore, in the MIMO antenna apparatus, the controller records history information on combinations of antenna elements selected when turning on the power to the MIMO antenna apparatus; selects a combination of antenna elements that is most frequently selected; and controls the switch circuit to connect the selected combination of antenna elements to the demodulator circuit.

Moreover, in the MIMO antenna apparatus, the controller records history information on combinations of antenna elements selected when starting MIMO communication; selects a combination of antenna elements that is most frequently selected; and controls the switch circuit to connect the selected combination of antenna elements to the demodulator circuit.

Further, in the MIMO antenna apparatus, the controller records history information on combinations of antenna elements selected when starting MIMO communication, for each application; selects a combination of antenna elements that is most frequently selected for an application to be used; and controls the switch circuit to connect the selected combination of antenna elements to the demodulator circuit.

Furthermore, in the MIMO antenna apparatus, in every detection clock time, the controller calculates the current transmission capacity and the estimated transmission capacity, and when the current transmission capacity becomes lower than the estimated transmission capacity, controls the switch circuit to connect the further antenna element to the demodulator circuit.

Moreover, in the MIMO antenna apparatus, the detection clock time is determined by a pilot signal of the received radio signals.

Further, in the MIMO antenna apparatus, the demodulator circuit is a modulator and demodulator circuit for further generating radio signals modulated by a MIMO scheme. When transmitting the radio signals, the controller controls the switch circuit to connect those antenna elements used when receiving radio signals, among the at least three antenna elements, to the modulator and demodulator circuit.

According to the second aspect of the present invention, a MIMO antenna apparatus is provided, which is provided with at least two antenna elements each having a plurality of feeding points and receiving radio signals, and a demodulator circuit for demodulating radio signals received through the at least two antenna elements by using a MIMO (Multi-Input Multi-Output) scheme. The apparatus is further provided with: a detector circuit for detecting received-signal levels of the respective radio signals received by the respective antenna elements; a switch circuit for connecting one of the feeding points on each of the antenna elements, to the demodulator circuit, respectively; a degree-of-coupling memory for storing, in advance, degrees of electromagnetic coupling between the at least two antenna elements, for respective possible combinations of the feeding points to be connected to the demodulator circuit; and a controller for controlling the switch circuit based on the received-signal levels detected by the detector circuit and the degrees of electromagnetic coupling stored in the degree-of-coupling memory. The controller calculates a current transmission capacity based on the received-signal levels detected by the detector circuit; calculates an estimated transmission capacity assuming that at least one of the feeding points of the antenna elements currently connected to the demodulator circuit is changed to a further feeding point of the same antenna element, based on the received-signal levels detected by the detector circuit and the degrees of electromagnetic coupling stored in the degree-of-coupling memory; and when the current transmission capacity becomes lower than the estimated transmission capacity, controls the switch circuit to connect the further feeding point to the demodulator circuit.

According to the third aspect of the present invention, a wireless communication apparatus including a MIMO antenna apparatus is provided. The MIMO antenna apparatus is provided with: at least three antenna elements for respectively receiving radio signals; a demodulator circuit for demodulating radio signals received through at least two of the antenna elements by using a MIMO (Multi-Input Multi-Output) scheme; a detector circuit for detecting received-signal levels of the respective radio signals received by the respective antenna elements; a switch circuit for connecting at least two of the antenna elements to the demodulator circuit; a degree-of-coupling memory for storing, in advance, degrees of electromagnetic coupling among the at least three antenna elements; and a controller for controlling the switch circuit based on the received-signal levels detected by the detector circuit and the degrees of electromagnetic coupling stored in the degree-of-coupling memory. The controller calculates a current transmission capacity based on the received-signal levels detected by the detector circuit; calculates an estimated transmission capacity assuming that at least one of the antenna elements currently connected to the demodulator circuit is changed to a further antenna element not connected to the demodulator circuit, based on the received-signal levels detected by the detector circuit and the degrees of electromagnetic coupling stored in the degree-of-coupling memory; and when the current transmission capacity becomes lower than the estimated transmission capacity, controls the switch circuit to connect the further antenna element to the demodulator circuit.

According to the fourth aspect of the present invention, a wireless communication apparatus including a MIMO antenna apparatus is provided. The MIMO antenna apparatus is provided with: at least two antenna elements each having a plurality of feeding points and receiving radio signals; a demodulator circuit for demodulating radio signals received through the at least two antenna elements by using a MIMO (Multi-Input Multi-Output) scheme; a detector circuit for detecting received-signal levels of the respective radio signals received by the respective antenna elements; a switch circuit for connecting one of the feeding points on each of the antenna elements, to the demodulator circuit, respectively; a degree-of-coupling memory for storing, in advance, degrees of electromagnetic coupling between the at least two antenna elements, for respective possible combinations of the feeding points to be connected to the demodulator circuit; and a controller for controlling the switch circuit based on the received-signal levels detected by the detector circuit and the degrees of electromagnetic coupling stored in the degree-of-coupling memory. The controller calculates a current transmission capacity based on the received-signal levels detected by the detector circuit; calculates an estimated transmission capacity assuming that at least one of the feeding points of the antenna elements currently connected to the demodulator circuit is changed to a further feeding point of the same antenna element, based on the received-signal levels detected by the detector circuit and the degrees of electromagnetic coupling stored in the degree-of-coupling memory; and when the current transmission capacity becomes lower than the estimated transmission capacity, controls the switch circuit to connect the further feeding point to the demodulator circuit.

According to typical embodiments of the present invention, briefly speaking, the following effects can be achieved. According to the present invention, it is possible to provide a MIMO antenna apparatus in a small size, capable of maintaining receiving conditions in which radio signals respectively received by a plurality of antenna elements have high received powers, with small differences among the received powers, and with low electromagnetic coupling, thus achieving MIMO communication with high transmission capacity and high transmission quality, and provide a mobile wireless communication apparatus provided with the MIMO antenna apparatus. Specifically, according to the present invention, a wireless communication apparatus is provided with a plurality of antenna elements and a MIMO modulator and demodulator circuit, and characterized by controlling switch means for switching among the antenna elements, based on signal levels of signals received by the respective antenna elements. Then, when a received signal at any of the antenna elements is degraded, antenna elements are selected such that a distance between the antenna elements is reduced. By performing the above-described control process based on electromagnetic couplings among the antenna elements, and taking into account the reduction in unequal median value (received power differences among the antenna elements) and the electromagnetic couplings, it is possible to achieve an improvement in MIMO communication quality.

BRIEF DESCRIPTION OF THE DRAWINGS

Various objects, features, and advantages of the present invention will be disclosed as preferred embodiments which are described below with reference to the accompanying drawings.

DETAILED DESCRIPTION OF THE PREFERRED EMBODIMENTS

Figure 1:
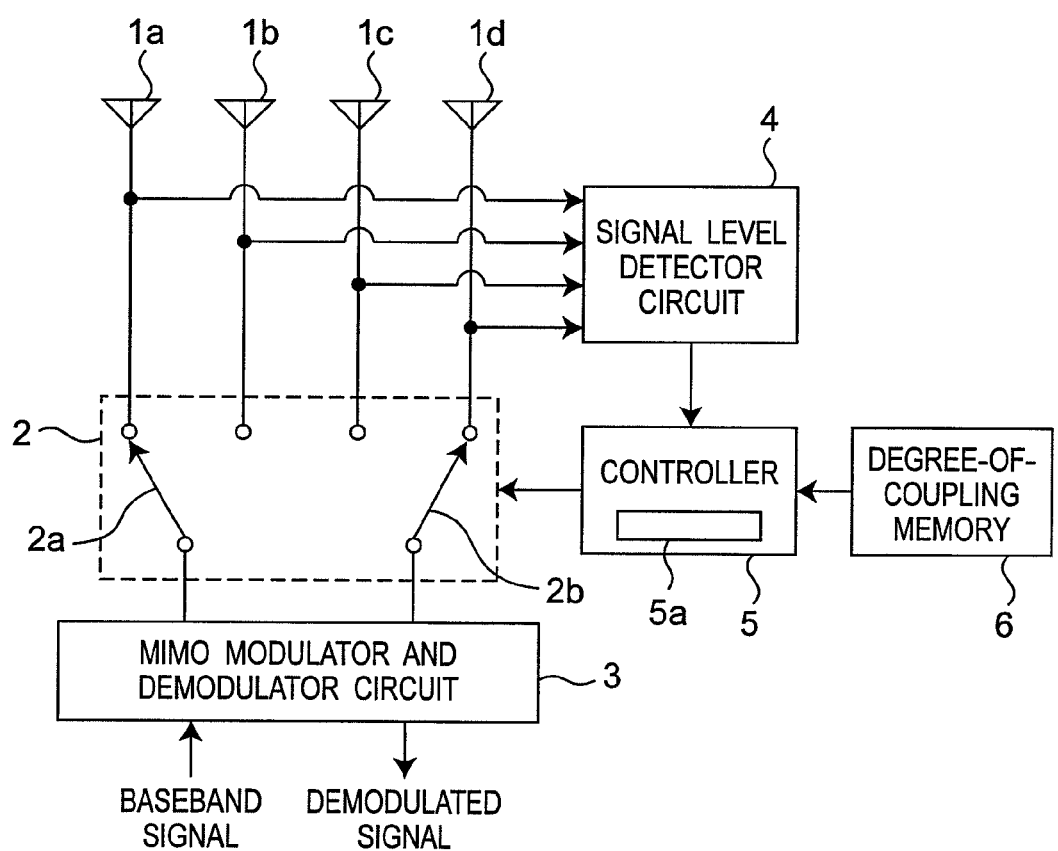
FIG. 1 is a block diagram showing an exemplary configuration of a MIMO antenna apparatus according to a preferred embodiment of the present invention.

Preferred embodiments of the present invention will be described in detail below with reference to the drawings. Note that components of similar functions are denoted by the same reference numerals throughout the drawings for describing the preferred embodiment of the present invention, and the descriptions thereof are not repeated.

FIG. 1 is a block diagram showing an exemplary configuration of a MIMO antenna apparatus according to a preferred embodiment of the present invention. With reference to FIG. 1, the MIMO antenna apparatus according to the present preferred embodiment will be described below. Referring to FIG. 1, the MIMO antenna apparatus is provided with four antenna elements 1a, 1b, 1c, and 1d, a switch circuit 2, a MIMO modulator and demodulator circuit 3, a signal level detector circuit 4, a controller 5, and a degree-of-coupling memory 6. The switch circuit 2 includes a switch 2a connected to the antenna elements 1a and 1b and to the MIMO modulator and demodulator circuit 3, and a switch 2b connected to the antenna elements 1c and 1d and to the MIMO modulator and demodulator circuit 3. The switch circuit 2 connects one of the antenna elements 1a and 1b, and one of the antenna elements 1c and 1d, to the MIMO modulator and demodulator circuit 3, according to control of the controller 5. The signal level detector circuit 4 is connected to the antenna elements 1a, 1b, 1c, and 1d. The signal level detector circuit 4 detects signal power levels (hereinafter, referred to as the "signal levels") of radio signals, that are transmitted from a MIMO sender-side base station apparatus (not shown) using a certain MIMO modulation scheme and arrive at the respective antenna elements 1a, 1b, 1c, and 1d, and then passes detection results to the controller 5. The degree-of-coupling memory 6 stores degrees of electromagnetic coupling among the antenna elements 1a, 1b, 1c, and 1d, which are measured in advance. The controller 5 performs a MIMO antenna control process, which will be described later, based on the detection results obtained by the signal level detector circuit 4 and the degrees of electromagnetic coupling among the antenna elements stored in the degree-of-coupling memory 6, thus controlling the switch circuit 2. The controller may optionally include a history-information memory 5a for storing history information on combinations of antenna elements selected. During receiving operation, the MIMO modulator and demodulator circuit 3 performs a MIMO demodulating process on received signals received by two of the antenna elements 1a, 1b, 1c, and 1d, and outputs one demodulated signal. On the other hand, during transmitting operation, the MIMO modulator and demodulator circuit 3 performs a MIMO modulating process on an inputted baseband signal and generates two transmission signals, and then transmits the generated transmission signals through two of the antenna elements 1a, 1b, 1c, and 1d.

It is preferable that if necessary, the MIMO antenna apparatus according to the present preferred embodiment is provided with a radio frequency filter for separating signals of a certain frequency from received signals; a radio frequency amplifier for amplifying received signals and transmitting signals; a radio frequency circuit or an intermediate-frequency circuit for frequency conversions, such as a mixer; a signal processing circuit; and the like; between the MIMO modulator and demodulator circuit 3 and the switch circuit 2. For ease of explanation, the above listed components are omitted in the present specification and the drawing. The same also applies to those drawings accompanying the present specification and indicating configurations of other MIMO antenna apparatuses.

Here, an exemplary embodiment is described in which four antenna elements are provided, and two of the antenna elements are connected to the MIMO modulator and demodulator circuit 3. However, the other configurations are also possible in which three or five or more antenna elements are provided, and three or more antenna elements are connected to the MIMO modulator and demodulator circuit 3.

Figure 2:
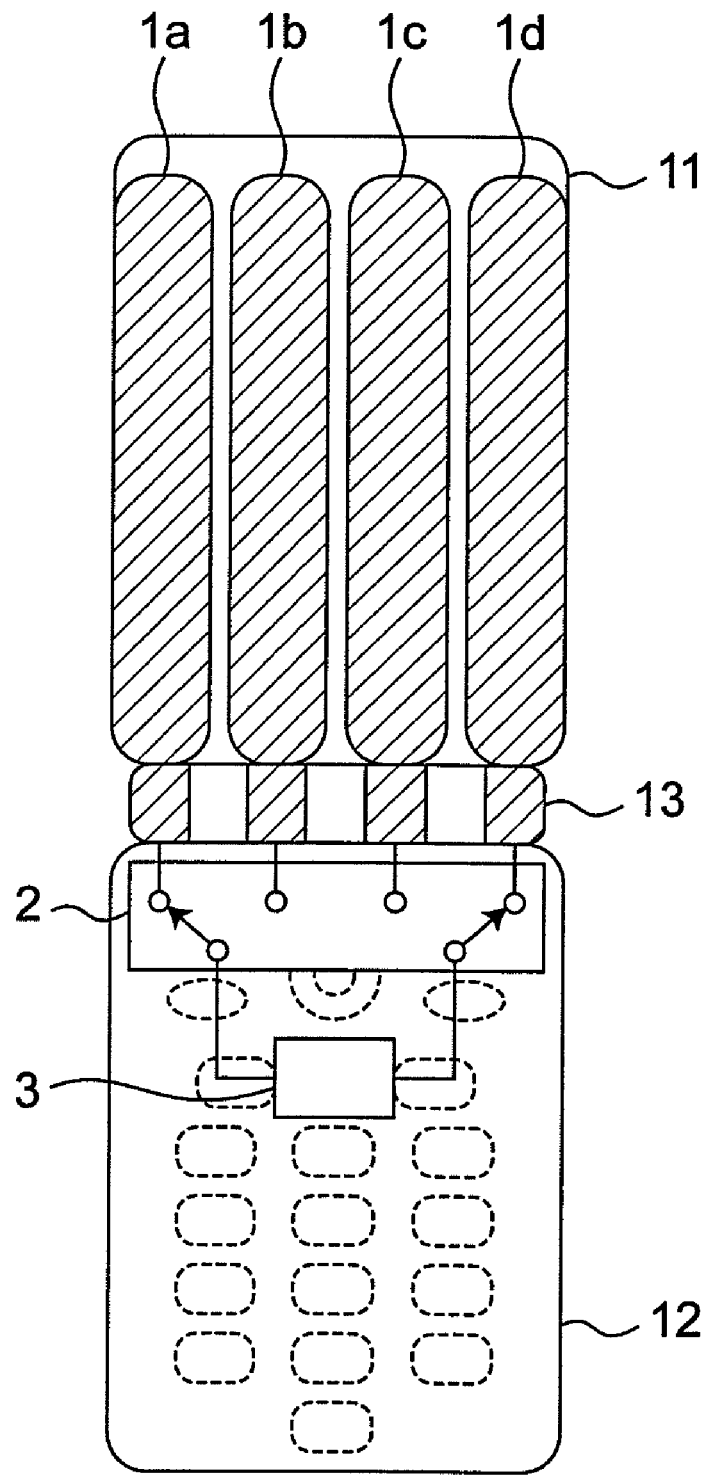
FIG. 2 is a transparent view showing an exemplary configuration of a portable wireless communication apparatus provided with a MIMO antenna apparatus, according to an exemplary implementation of the preferred embodiment of the present invention.

Next, with reference to FIG. 2, an example will be described in which the MIMO antenna apparatus according to the present preferred embodiment is implemented as a portable wireless communication apparatus. FIG. 2 is a transparent view showing an exemplary configuration of a portable wireless communication apparatus provided with a MIMO antenna apparatus, according to an exemplary implementation of the preferred embodiment of the present invention. The portable wireless communication apparatus of the present exemplary implementation is configured as a folding mobile phone which includes a substantially rectangular parallelepiped upper housing 11 and a substantially rectangular parallelepiped lower housing 12, and in which the upper housing 11 and the lower housing 12 are connected to each other by a hinge portion 13. The switch circuit 2, the MIMO modulator and demodulator circuit 3, the signal level detector circuit 4, the controller 5, and the degree-of-coupling memory 6 are provided within the lower housing 12, however, for ease of illustration, FIG. 2 and subsequent drawings only show the switch circuit 2 and the MIMO modulator and demodulator circuit 3 among these components. Furthermore, preferably, the upper housing 11 is provided with a speaker and a display, and the lower housing 12 provided with a keyboard and a microphone, however, these components are not shown. Inside the upper housing 11, four antenna elements 1a, 1b, 1c, and 1d, each made of a strip conductor, are provided in parallel with a longitudinal direction of the portable wireless communication apparatus, and are disposed in line from left to right of the upper housing 11 with a certain spacing provided therebetween. Each of the antenna elements 1a, 1b, 1c, and 1d is a monopole antenna. The antenna elements 1a, 1b, 1c, and 1d are connected to the switch circuit 2 and the signal level detector circuit 4 (now shown in FIG. 2) in the lower housing 12.

According to the above-described MIMO antenna apparatus according to the present preferred embodiment, the controller 5 calculates a current transmission capacity based on signal levels detected by the signal level detector circuit 4; calculates an estimated transmission capacity assuming that at least one of antenna elements currently connected to the MIMO modulator and demodulator circuit 3 is changed to other antenna element not connected to the MIMO modulator and demodulator circuit 3, based on the signal levels detected by the signal level detector circuit 4 and degrees of electromagnetic coupling stored in the degree-of-coupling memory 6; and when the current transmission capacity becomes lower than the estimated transmission capacity, controls the switch circuit 2 to connect the other antenna element to the MIMO modulator and demodulator circuit 3. Accordingly, it is possible to provide a MIMO antenna apparatus in a small size, capable of maintaining receiving conditions in which radio signals respectively received by the plurality of antenna elements have high received powers, with small differences among the received powers, and with low electromagnetic coupling, thus achieving MIMO communication with high transmission capacity and high transmission quality.

Now, the operation principle of the MIMO antenna apparatus according to the present preferred embodiment will be described below.

The MIMO communication system falls under a technique for increasing a transmission capacity and for increasing a total transmission rate in relation to a plurality of signal sequences after MIMO demodulation, by employing a plurality of antenna elements in each of a transmitter and a receiver and spatially multiplexing the plurality of signal sequences simultaneously transmitted in the same frequency band. In the present specification, it is described with reference to an eigenmode transmission scheme by way of example. Supposing that the number of antenna elements in each of the transmitter and the receiver is "n", the received signal y is expressed by the following equation:

$$y = Hx + w \quad (1)$$

where symbol "y" denotes a received signal and is of a vector with a size of "n", and each element of the vector denotes a signal received through each one of the antenna elements of the receiver. Symbol "H" denotes a matrix with a size of "n×n", the matrix is called "channel matrix", and each element "$H_{ij}$" of the matrix denotes a propagation coefficient between a j-th antenna element of the transmitter and an i-th antenna element of the receiver, i.e., amounts of phase rotation and amplitude attenuation for the signal transmitted between these antenna elements. Furthermore, symbol "x" denotes a transmitted signal and is of a vector with a size of "n", and each element "$x_i$" of the vector is a signal transmitted from each one of the antenna elements of the transmitter and orthogonal to the other signals. Symbol "w" is of a vector with a size of "n", and each element of the vector denotes a thermal noise received through each one of the antenna elements of the receiver.

For obtaining the channel matrix "H" at the receiver, the receiver stores therein a predetermined pilot signal "x" in advance, the transmitter transmits this known pilot signal "x" to the receiver, and the receiver calculates the channel matrix "H" by using equation (1) based on the pilot signal "x" previously stored in the receiver and the received signal "y" (i.e., the transmitted pilot signal "x").

Then, by carrying out a singular value decomposition (SVD) on the channel matrix "H", the following equation is obtained:

$$H = U\Sigma V^H = \sum_{i=1}^{q} \sigma_i u_i v_i^H \quad (2)$$

In equation (2), symbols "U", "Σ" and "V" denote matrixes each with a size of "n×n", and the matrix "Σ" consists of "$\sigma_i$" ($0 \leq i \leq q$) at i-th row and an i-th column elements and 0 at the other elements. Further, symbol "$u_i$" denotes i-th column vector of the matrix "U", and is orthogonal to the other column vectors, and similarly, symbol "$v_i$" denotes i-th column vector of the matrix "V", and is orthogonal to the other vectors. Symbol "q" denotes a rank of the channel matrix "H", and let q=n in the following description. A superscript "H" denotes a complex conjugate transposition. Further, the matrixes "U" and "V" satisfy the following equation:

$$U^H U = I_n \quad (3), \text{ and}$$

$$V^H V = I_n \quad (4),$$

where the symbol "$I_n$" is an identity matrix with a size of "n×n".

Moreover, by carrying out eigenvalue decomposition (EVD), the following equation (5) is obtained:

$$HH^H = U\Sigma V^H (U\Sigma V^H)^H \quad (5)$$
$$= U\Sigma\Sigma^H U^H$$
$$= \sum_{i=1}^{q} \lambda_i u_i u_i^H$$

In equation (5), symbol "$\lambda_i$" denote eigenvalues of a channel matrix product $HH^H$ and satisfies $\lambda_i = \sigma_i^2$.

A vector "$u_i^H$" is orthogonal to the other row vectors of the matrix "$U^H$", and used as weight coefficients (amplitudes and phases) for the signals transmitted from the respective antenna elements of the transmitter. The vector "$u_i$" is orthogonal to the other column vectors of the matrix "U", and used as weight coefficients (amplitudes and phases) for the signals received at the respective antenna elements of the receiver. By using the weight coefficients in such manner, orthogonal directivities can be obtained.

Now, according to equation (1), respective powers of the received signals are represented as: Hx (Hx)$^H$=$HH^H xx^H$. The matrix $xx^H$ represents respective powers of the transmitted signals. It is to be noted that since the respective elements of the vector "x" are the signals orthogonal to one another, the matrix $xx^H$ is a diagonal matrix diag [$x_1 x_1^*, x_2 x_2^*, \ldots, x_n x_n^*$], and the matrix $HH^H$ is a diagonal matrix diag [$\lambda_1, \lambda_2, \ldots, \lambda_q$]. Namely, by employing the orthogonal weight coefficients for the respective antenna elements in each of the transmitter and the receiver, a plurality of propagation channels can be separated, and in this case, the respective powers of the received signals are $\lambda_i x_i x_i^*$. If all the signals "$x_i$" are equal to each other, the powers of the received signals in the respective propagation channel are proportional to the eigenvalues "$\lambda_i$".

Here, it is specifically described how to derive the powers of received signals, by taking a MIMO communication system as an example in which a transmitter has two antenna elements and a receiver has two antenna elements. In this case, the channel matrix "H", and the transmitted signal vector "x" including the signals transmitted from the antenna elements of the transmitter are expressed by the following equations, respectively:

$$H = \begin{bmatrix} H_{11} & H_{12} \\ H_{21} & H_{22} \end{bmatrix} \quad (6)$$

$$x = \begin{bmatrix} x_1 \\ x_2 \end{bmatrix} \quad (7)$$

Now, supposing that the symbol "w" denotes a noise vector (ratio in amplitude with respect to the transmitted signal vector "x") including the noises received through the antenna elements of the receiver, a received signal vector "y" is expressed by the following equation:

$$y = H \cdot x + w \quad (8)$$
$$= \begin{bmatrix} H_{11} & H_{12} \\ H_{21} & H_{22} \end{bmatrix} \begin{bmatrix} x_1 \\ x_2 \end{bmatrix} + \begin{bmatrix} w_1 \\ w_2 \end{bmatrix}$$
$$= \begin{bmatrix} y_1 \\ y_2 \end{bmatrix}$$

Next, a covariance matrix "$R_{yy}$" of the received signal vector is calculated from the following equation:

$$R_{yy} = y \cdot y^H \quad (9)$$
$$= \begin{bmatrix} y_1 \\ y_2 \end{bmatrix} \cdot [y_1^* \; y_2^*]$$

The vector "$y^H$" in the above equation is expressed by the following equation:

$$y^H = [y_1^* \; y_2^*] \quad (10)$$
$$= [x_1^* \; x_2^*] \begin{bmatrix} H_{11}^* & H_{21}^* \\ H_{12}^* & H_{22}^* \end{bmatrix} + [w_1^* \; w_2^*]$$

Generally speaking, in the MIMO communication system, different signals transmitted from the different antenna elements of the transmitter are uncorrelated to one another. Now, the meaning of the statement that the transmitted signals are uncorrelated is described below. It is supposed that a transmitted signal sequence is a one-dimensional signal sequence consisting of elements "−1" and "1". For example, consider a case that each of the transmitted signal vectors "$x_1$" and "$x_2$" includes the following four elements:

$$x_1 = (1, -1, 1, 1) \quad (11)$$

$$x_2 = (1, 1, -1, 1) \quad (12)$$

Under a definition of "correlation", i.e., a sum of products of the corresponding elements in the respective signal sequences divided by the length of the signal sequences, a correlation value "$R_{12}$" between the transmitted signal vectors "$x_1$" and "$x_2$" is expressed by the following equation:

$$R_{12} = (1 \cdot 1 + (-1) \cdot 1 + 1 \cdot (-1) + 1 \cdot 1)/4 = 0 \quad (13)$$

Namely, if the correlation value "$R_{12}$" is 0, the transmitted signal vectors "$x_1$" and "$x_2$" are uncorrelated to each other. Conversely, the correlation value "$R_{12}$" is 1 in the case of $x_1 = x_2$. Furthermore, the noise vector is uncorrelated to the transmitted signal vectors, and the noise vectors received through different antenna elements are uncorrelated to one another.

Accordingly, as the powers of the received signals, an expectation of the covariance matrix "$R_{yy}$" of equation (9) can be calculated by the following equation:

$$R_{yy} = \begin{bmatrix} y_1 \\ y_2 \end{bmatrix} [y_1^* \; y_2^*] \quad (14)$$
$$= \begin{bmatrix} H_{11} & H_{12} \\ H_{21} & H_{22} \end{bmatrix} \begin{bmatrix} x_1 \\ x_2 \end{bmatrix} [x_1^* \; x_2^*] \begin{bmatrix} H_{11}^* & H_{21}^* \\ H_{12}^* & H_{22}^* \end{bmatrix} + \begin{bmatrix} w_1 \\ w_2 \end{bmatrix} [w_1^* \; w_2^*]$$
$$= \begin{bmatrix} H_{11} & H_{12} \\ H_{21} & H_{22} \end{bmatrix} \begin{bmatrix} H_{11}^* & H_{21}^* \\ H_{12}^* & H_{22}^* \end{bmatrix} + \begin{bmatrix} |w_1|^2 & w_1 w_2^* \\ w_2 w_1^* & |w_2|^2 \end{bmatrix}$$
$$= H \cdot H^H + \begin{bmatrix} |w_1|^2 & 0 \\ 0 & |w_2|^2 \end{bmatrix}$$
$$= H \cdot H^H + |w|^2 \begin{bmatrix} 1 & 0 \\ 0 & 1 \end{bmatrix}$$

where the following equation is employed from the assumption on the transmitted signal vectors:

$$R_{xx} = \begin{bmatrix} x_1 \\ x_2 \end{bmatrix} [x_1^* \; x_2^*] \quad (15)$$
$$= \begin{bmatrix} |x_1|^2 & x_1 x_2^* \\ x_2 x_1^* & |x_2|^2 \end{bmatrix}$$
$$= \begin{bmatrix} 1 & 0 \\ 0 & 1 \end{bmatrix}$$

According to the operation principle of the MIMO antenna apparatus described above, a transmission capacity of the MIMO communication system is obtained by the following equation:

$$C_{MIMO} = \log_2 \left| I_n + \frac{SNR}{n} H H^H \right| \quad (16)$$
$$= \sum_{i=1}^{q} \log_2 \left( 1 + \frac{SNR}{n} \lambda_i \right)$$

where
symbol "SNR" denotes a total transmitted signal power-to-noise ratio, i.e., satisfies $SNR/n = x_1 x_i^*$. The unit of "$C_{MIMO}$" is [bit/sec/Hz]. On the other hand, in case of normal one-to-one communication (Single-Input Single-Output: SISO) in which the transmitter employs one antenna element and the receiver employs one antenna element, a transmission capacity is obtained by the following equation:

$$C_{SISO} = \log_2(1 + SNR \cdot hh^*) \quad (17)$$

In equation (17), symbol "h" denotes a propagation coefficient, and the unit of "$C_{SISO}$" is [bit/sec/Hz].

It is supposed that for example, $hh^* = \lambda_i = \lambda$ and $SNR \cdot \lambda/n \gg 1$ for simplification of comparison between equations (16) and (17). In this case, the transmission capacity expressed by equation (16) is calculated as shown in the following equation:

$$C_{MIMO} = n \cdot (\log_2(SNR \cdot \lambda) - \log_2(n)) \quad (18)$$

On the other hand, the transmission capacity expressed by equation (17) is calculated as shown in the following equation:

$$C_{SISO} = \log_2(SNR \cdot \lambda) \quad (19)$$

In a case of n=4 and SNR×λ=1024, for example, the MIMO transmission capacity $C_{MIMO} = 4 \times (10-2) = 32$ [bit/sec/Hz] and a SISO transmission capacity $C_{SISO} = 10$ [bit/sec/Hz].

Therefore, it is understood that the MIMO transmission capacity increases more than the SISO transmission capacity.

In such manner, the MIMO antenna apparatus spatially multiplexes signals and increases the transmission capacity by allocating to each of the signal sequences the directivity that signals are orthogonal to one another, and accordingly, the total transmission rate of the MIMO-demodulated signal sequences can be improved.

According to equation (16), it can be seen that the larger the eigenvalues "$\lambda_i$" calculated from the channel matrix "H" become, the more the MIMO transmission capacity increases. This means that higher-rate transmission can be achieved as the respective elements of the channel matrix "H" increase, since the eigenvalues "$\lambda_i$" are obtained by the respective elements of the channel matrix "H". Moreover, as expressed in equation (1), the received signal vector includes the thermal noise vector "w". Because thermal noise components can not be eliminated in the actual receiver, it causes errors when calculating the eigenvalues "$\lambda_i$" from the channel matrix "H". Accordingly, in order to improve the transmission rate of the MIMO antenna apparatus, the powers of the received signals are to be made as large as possible. Further, the channel matrix "H" includes the gains of the antenna elements of the transmitter and the receiver, in addition to propagation loss. Accordingly, it can be seen that under the same propagation environment, the antenna elements with high gains are preferred.

Thus, in a MIMO antenna apparatus, the respective received signals received by a plurality of antenna elements should be in good receiving conditions at the same time. However, in a wireless communication apparatus that is used particularly in proximity to the human body, such as a mobile phone, the directivities of some of antenna elements may degrade due to the influence of the human body or the like. Because of this degradation, the high-speed wireless communication capability inherent to a MIMO antenna apparatus may be lost.

Now, a method is described below for improving MIMO communication quality by reducing a significant degradation in radiation characteristics caused by a user holding a portable wireless communication apparatus with his/her hand.

First, referring to an example in which a plurality of antenna elements operate as a transmitting antenna array, electromagnetic coupling among the antenna elements will be described. Electromagnetic coupling is defined by the proportion of radio waves radiated from one antenna element and received by other antenna elements in the transmitting antenna array, to the total radio waves radiated from the one antenna element. Specifically, it is desirable that in ideal conditions, all the power inputted to one antenna element of the transmitting antenna array is radiated as radio waves to be received by remote receiving antennas. However, since the radiated radio wave may be partially received by other antenna elements in the transmitting antenna array close to the transmitting antenna element in the transmitting antenna array, not 100% of the power inputted to the antenna element contributes radiation. Namely, let "$P_{rad}$" [W] be the power of a radiated radio wave, let "$P_{in}$" [W] be the power inputted to an antenna element, and let "$C_{em}$" be the electromagnetic coupling, then the following equation is obtained.

$$P_{rad}=(1-C_{em})P_{in} \quad (20)$$

That is, ($1-C_{em}$) indicates radiation efficiency. In this case, the larger the electromagnetic coupling "$C_{em}$" is, the lower the power "$P_{rad}$" decreases, and thus, the radiation efficiency is reduced.

In the above description, the electromagnetic coupling among antenna elements is described based on the transmission of radio waves from an antenna. The same also applies to the case of reception due to reversibility of antenna characteristics (which corresponds to the reciprocity theorem in electric circuit theory, and is known to skilled persons as the "antenna reciprocity theorem"), and thus, the larger the electromagnetic coupling is, the lower the antenna efficiency becomes, and accordingly, received power is reduced. Electromagnetic coupling depends strongly on a distance between antenna elements, i.e., the farther the distance is, the smaller the electromagnetic coupling becomes.

Figure 3:
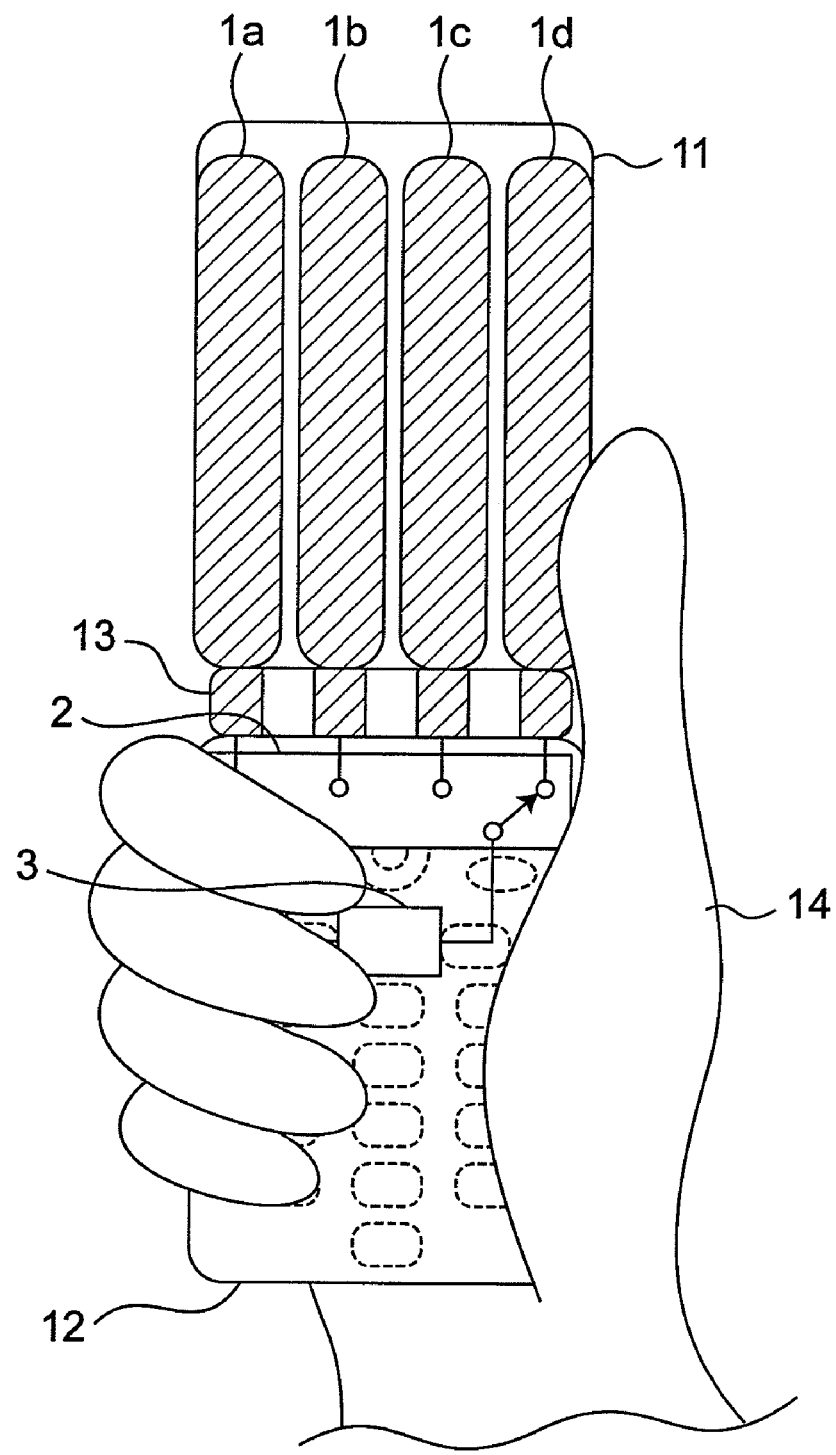
FIG. 3 is a transparent view showing an exemplary situation in which the portable wireless communication apparatus of FIG. 2 is held with a user's hand 14.
Figure 4:
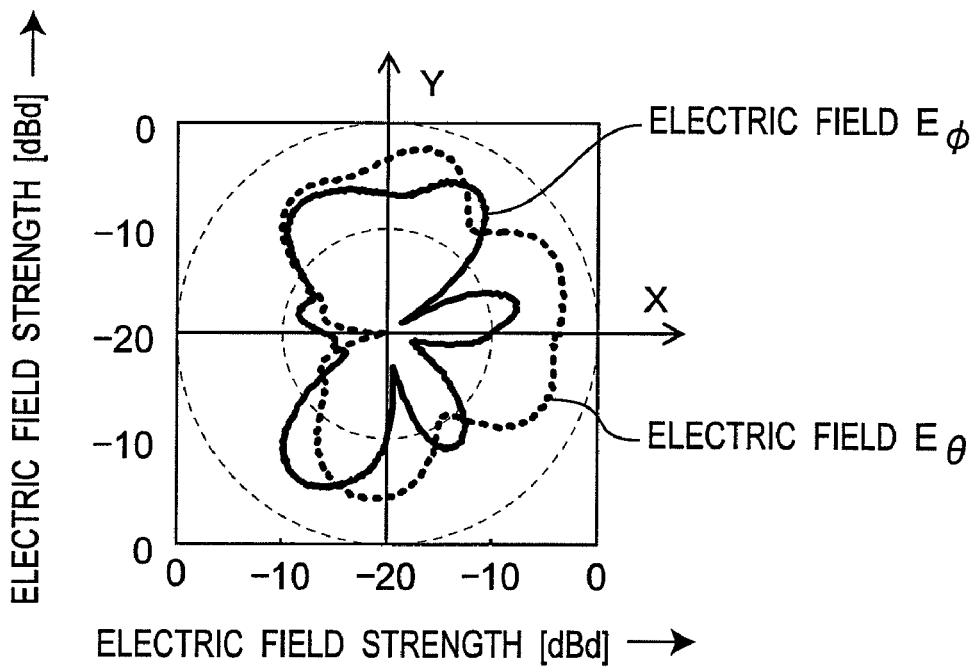
FIG. 4 is a radiation pattern diagram showing an example of horizontal plane radiation characteristics of a helical antenna.
Figure 5:
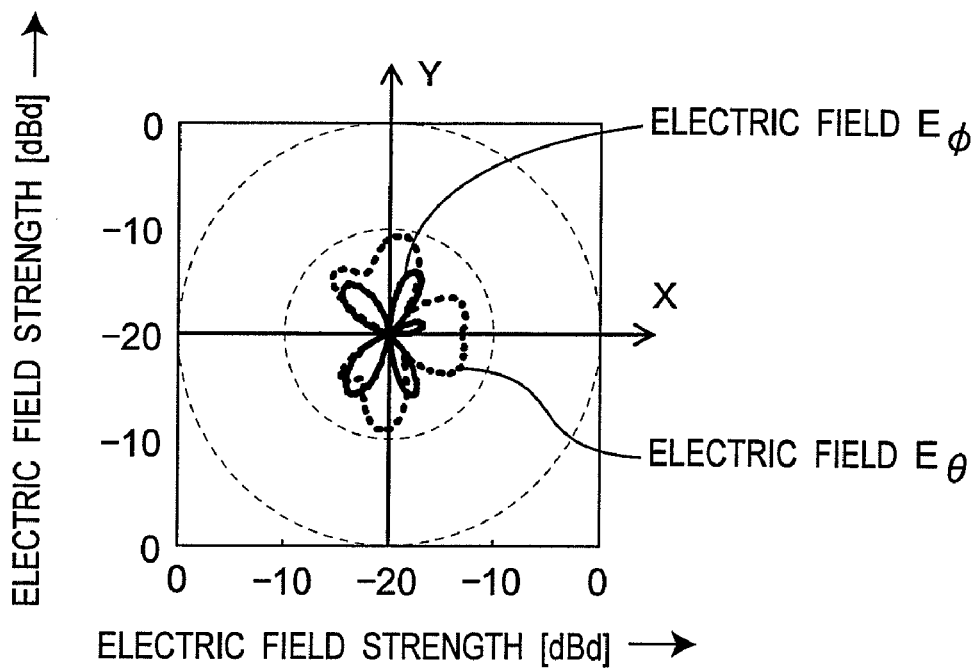
FIG. 5 is a radiation pattern diagram showing an example of horizontal plane radiation characteristics for when a user's finger touches the helical antenna of FIG. 4.

Next, with reference to FIGS. 2 to 5, degradation in radiation characteristics will be described in the case that a user holds a portable wireless communication apparatus according to the present preferred embodiment with his/her hand. In the portable wireless communication apparatus of FIG. 2 provided with the antenna elements 1a, 1b, 1c, and 1d, the outer antenna elements 1a and 1d are the most distant from each other, and thus, the electromagnetic coupling between the antenna elements 1a and 1d is minimum. In contrast, a distance between the inner antenna elements 1b and 1c is minimum, and thus, their electromagnetic coupling is maximum. That is, it is possible to achieve higher speed MIMO wireless communication by selecting the antenna elements 1a and 1d having the minimum electromagnetic coupling, as antenna elements to be connected to the MIMO modulator and demodulator circuit 3. Now, consider a case of holding the portable wireless communication apparatus of FIG. 2 with a hand. FIG. 3 is a transparent view showing an exemplary situation in which the portable wireless communication apparatus of FIG. 2 is held with a user's hand 14. For example, when holding the portable wireless communication apparatus with a right hand as shown in FIG. 3, a thumb may often come close to the antenna element 1d. When a finger comes very close to an antenna element, or when an antenna element is covered with a hand, it results in a very large loss, thus largely reducing received power. In the example of FIG. 3, the antenna element 1a has almost no loss caused by holding the apparatus with a hand because any finger is not close to the antenna element 1a, on the other hand, the antenna element 1d suffers much degradation. FIGS. 4 and 5 show an example of radiation pattern changes for when a finger comes close to an exemplary helical antenna. FIG. 4 is a radiation pattern diagram showing an example of horizontal plane radiation characteristics of the helical antenna, and FIG. 5 is a radiation pattern diagram showing an example of horizontal plane radiation characteristics for when a user's finger touches the helical antenna of FIG. 4. According to FIGS. 4 and 5, one can see much degradation in radiation efficiency due to the user's finger touching the antenna. In the MIMO antenna apparatus according to the present preferred embodiment, the antenna element 1d with much degradation is changed to the antenna element 1c by the switch circuit 2. The antenna element 1c is located on the inside of the apparatus compared to the antenna element 1d, and thus is less influenced by the finger. On the other hand, since the antenna element 1c is close to the antenna element 1a, the electromagnetic coupling between the antenna elements 1c and 1a increases, and accordingly, radiation efficiency may degrade.

In the MIMO antenna apparatus according to the present preferred embodiment, when receiving through the antenna elements 1a and 1d, if a received signal at the antenna element 1d is degraded by a finger coming close to the antenna element 1d, the apparatus compares the degree of degradation in the received signal at the antenna element 1d (measured value) to the degree of degradation due to the degree of electromagnetic coupling between the antenna elements $1a$ and $1c$ assuming to receive through the antenna elements $1a$ and $1c$ (estimated value), and determines antenna elements to be connected to the MIMO modulator and demodulator circuit 3, based on the comparison result. Accordingly, the MIMO antenna apparatus according to the present preferred embodiment can achieve higher speed MIMO wireless communication.

Figure 6:
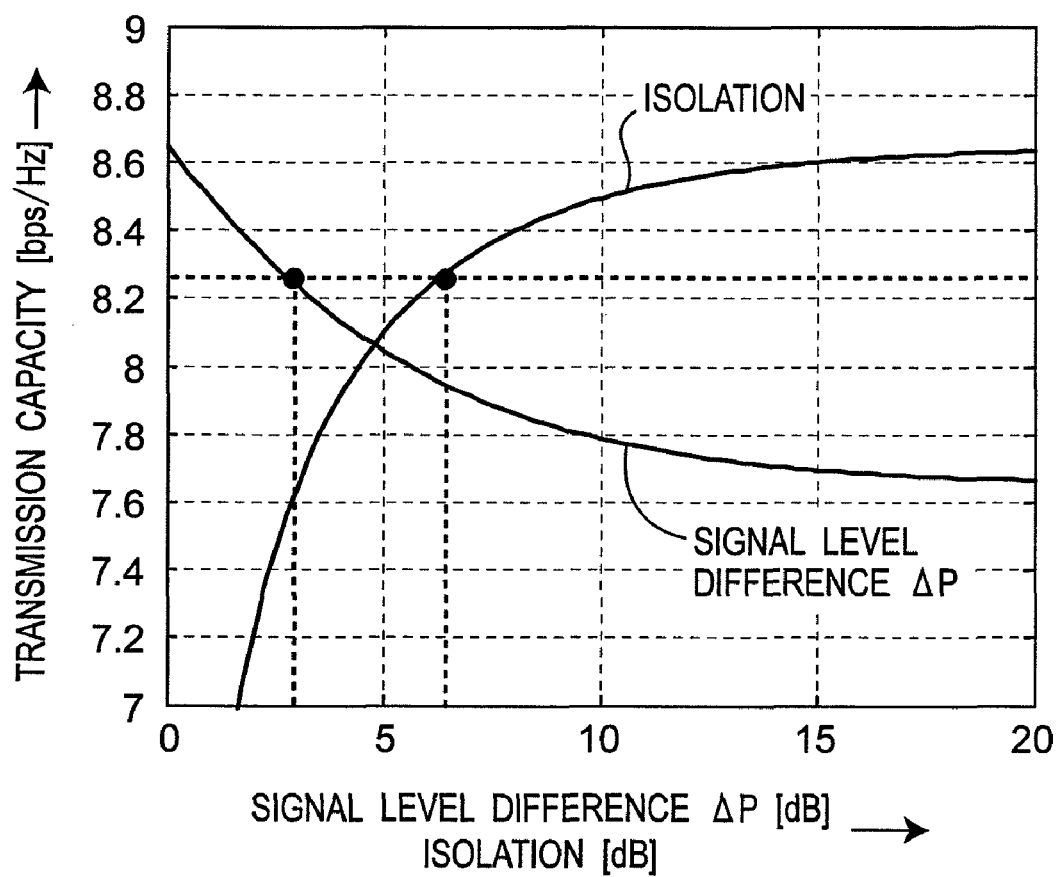
FIG. 6 is a graph showing an example of transmission capacity of the MIMO antenna apparatus.

FIG. 6 is a graph showing an example of transmission capacity of the MIMO antenna apparatus. FIG. 6 shows a relationship of MIMO transmission capacity to signal level difference (i.e., difference in power) ΔP, and a relationship of MIMO transmission capacity to isolation, for an exemplary MIMO antenna apparatus with two elements. In the MIMO antenna apparatus used in a simulation of FIG. 6, two antenna elements are configured symmetrically and have the same radiation efficiency, and thus, the existence of a signal level difference implies that power reduction due to a finger has occurred in one of the antenna elements. That is, the larger the power is reduced due to a finger, the larger the signal level difference becomes. On the other hand, the isolation represents electromagnetic coupling between the antenna elements. The isolation is a reciprocal of the degree of electromagnetic coupling, and thus, the higher the degree of electromagnetic coupling is, the smaller the isolation becomes. It can be seen from FIG. 6 that the larger the signal level difference is, the lower the transmission capacity becomes, and that the smaller the isolation is, the lower the transmission capacity becomes. For example, when the signal level difference is 3 dB or more, the MIMO transmission capacity is 8.25 bps/Hz or less. On the other hand, when the isolation is 6 dB or more, the MIMO transmission capacity is 8.25 bps/Hz or more. Namely, assuming that the isolation between the antenna elements $1a$ and $1c$ is 6 dB or more in the MIMO antenna apparatus according to the present preferred embodiment, when receiving through the antenna elements $1a$ and $1d$, if a received signal at the antenna element $1d$ is degraded by 3 dB or more due to a finger, then the antenna element $1d$ can be changed to the antenna element $1c$, thus achieving higher speed MIMO communication. As such, in the MIMO antenna apparatus according to the present preferred embodiment, it is possible to achieve the control with higher accuracy, by taking into account not only received powers at the respective antenna elements, but also the degrees of electromagnetic coupling among the antenna elements.

Now, a calculation method of transmission capacity used in the present preferred embodiment will be described below. For ease of explanation, it is assumed that received signals to be received by the antenna elements $1a$, $1b$, $1c$, and $1d$ are uncorrelated to one another. In this case, the eigenvalues calculated from a channel matrix "H" are received powers "$Pr_i$" ($i=1a, 1b, 1c,$ and $1d$) at the respective antenna elements $1a, 1b, 1c,$ and $1d$. Accordingly, the transmission capacity is given by the following equation:

$$C_{MIMO} = \sum_{i=1a,1b,1c,1d} \log_2\left(1 + \frac{Pr_i}{Pn}\right) \quad (21)$$

where "Pn" is noise power defined by Pn=kBT, where "k" is the Boltzmann factor, "B" is a frequency bandwidth [Hz], and "T" is an absolute temperature [k]. The noise power "Pn" can be calculated in advance according to the implementation of the MIMO antenna apparatus. The received power "$Pr_i$" of an antenna element, that is not connected to the MIMO modulator and demodulator circuit 3, is 0. The following exemplary description shows the case in which when receiving through the antenna elements $1a$ and $1d$, the received power at the antenna element $1d$ is low. In this case, a received power is estimated assuming that the antenna element $1d$ has been changed to the inner antenna element $1c$. Let "$Pr_{max}$" be the maximum of received powers "$Pr_{1a}$" and "$Pr_{1d}$" at the antenna elements $1a$ and $1d$. Further, let "$C_{em\_ad}$" be the degree of coupling between the outer antenna elements $1a$ and $1d$, and let "$C_{em\_ac}$" be the degree of coupling between the outer antenna element $1a$ and the inner antenna element $1c$. Now, assuming that the antenna elements used has been changed from $1a$ and $1d$ to $1a$ and $1c$, estimated received powers $Pr_{1a}'$ and $Pr_{1c}'$ can be obtained by the following equations:

$$Pr_{1a}' = Pr_{max}(1 - C_{em\_ac} + C_{em\_ad}) \quad (22)$$

$$Pr_{1c}' = Pr_{max}(1 - C_{em\_ac} + C_{em\_ad}) \quad (23)$$

In the above equations, for simplification, the power "$Pr_{max}$" is used as a reference of received power. In this case, the current transmission capacity "$C_{MIMO\_ad}$" is given by the following equation (24), by substituting the current received powers "$Pr_{1a}$" and "$Pr_{1d}$" into equation (21). The transmission capacity "$C_{MIMO\_ac}$" assuming that the antenna elements used are changed from $1a$ and $1d$ to $1a$ and $1c$ is given by the following equation (25), by substituting the estimated received powers $Pr_{1a}'$ and $Pr_{1c}'$ into equation (21).

$$C_{MIMO\_ad} = \log_2\left(1 + \frac{Pr_{1a}}{Pn}\right) + \log_2\left(1 + \frac{Pr_{1d}}{Pn}\right) \quad (24)$$

$$C_{MIMO\_ac} = \log_2\left(1 + \frac{Pr'_{1a}}{Pn}\right) + \log_2\left(1 + \frac{Pr'_{1c}}{Pn}\right) \quad (25)$$

Comparing these two transmission capacities in equations (24) and (25), then the one with higher transmission capacity is selected.

When the received powers at the antenna elements $1a$ and $1d$ satisfy $Pr_{1a} < Pr_{1d}$, received powers and a transmission capacity are estimated assuming that the antenna elements used are changed from $1a$ and $1d$ to $1b$ and $1d$, and then the comparison and selection processes are performed in a similar manner.

As a modification, it is also possible to select antenna elements, approximately, based on a comparison of received powers (i.e., a comparison between power $Pr_{1a}+Pr_{1d}$ and power $Pr_{1a}'+Pr_{1c}'$), without calculating equations (24) and (25).

Figure 7:
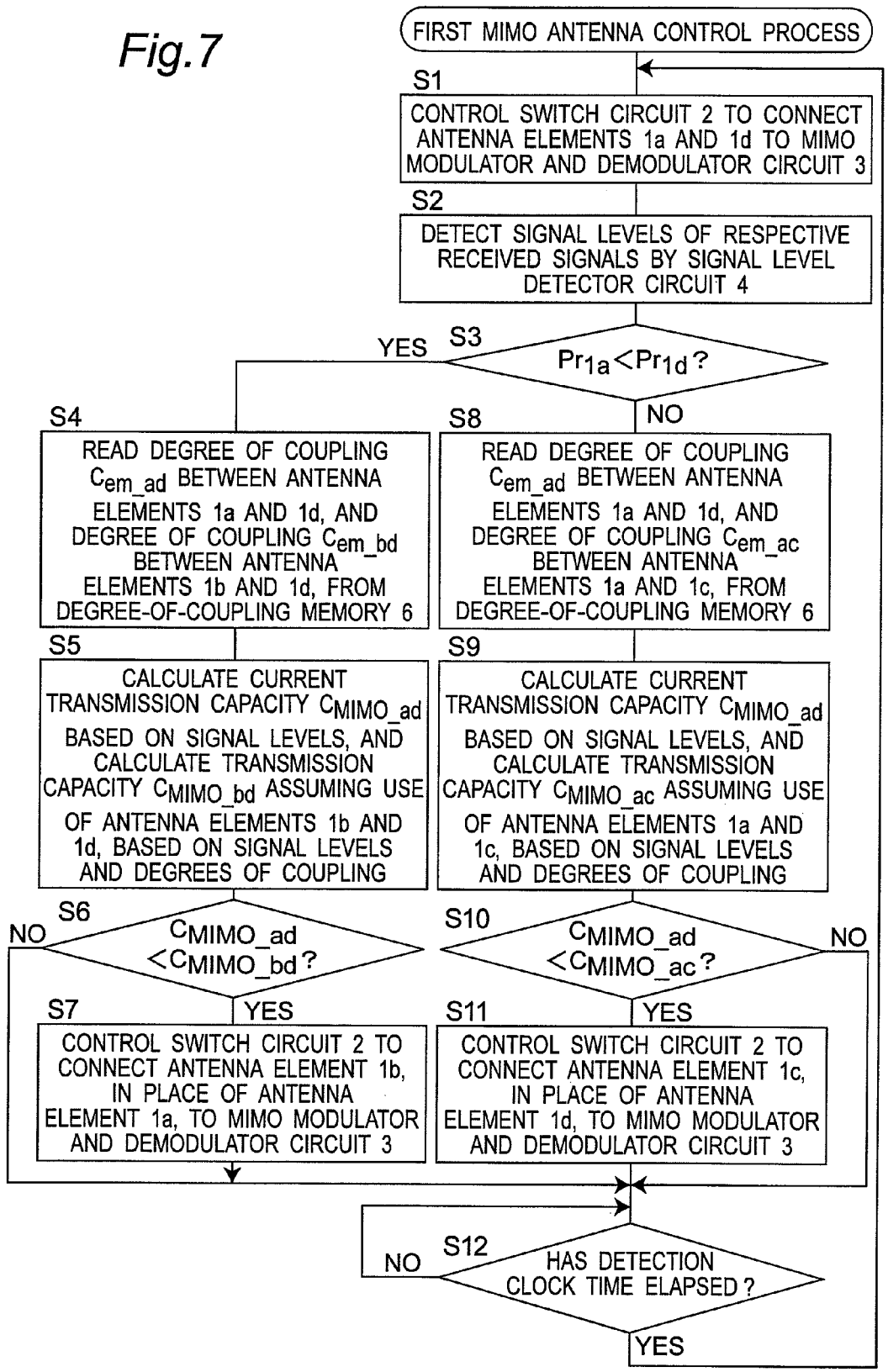
FIG. 7 is a flowchart showing an example of a first MIMO antenna control process performed by a controller 5 of FIG. 1.
Figure 8:
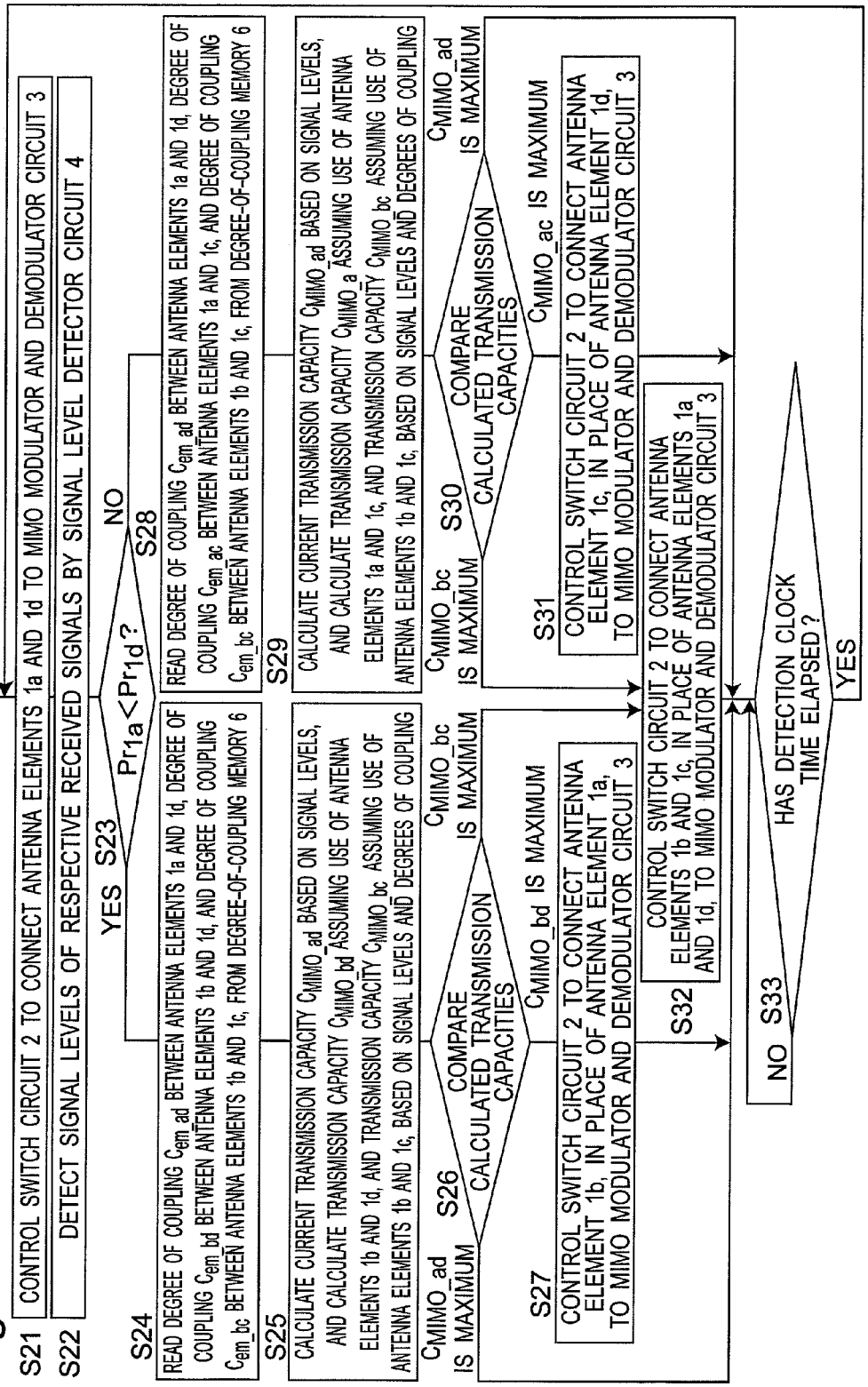
FIG. 8 is a flowchart showing an example of a second MIMO antenna control process performed by the controller 5 of FIG. 1.

With reference to FIGS. 7 and 8, an example of a MIMO antenna control process performed by the controller 5 of FIG. 1 will be described below.

FIG. 7 is a flowchart showing an example of a first MIMO antenna control process performed by the controller 5 of FIG. 1. First, in step S1, the controller 5 controls the switch circuit 2 to connect the antenna elements $1a$ and $1d$ to the MIMO modulator and demodulator circuit 3, as its initial state. In step S2, the controller 5 detects signal levels of respective received signals by the signal level detector circuit 4. Then, in step S3, the controller 5 determines whether or not a received power $Pr_{1d}$ at the antenna element $1d$ is higher than a received power $Pr_{1a}$ at the antenna element $1a$, based on the detected signal levels of the respective received signals. If YES then the process proceeds to step S4, and if NO then the process proceeds to step S8. In step S4, the controller 5 reads a degree of coupling $C_{em\_ad}$ between the antenna elements $1a$ and $1d$, and a degree of coupling $C_{em\_bd}$ between the antenna elements $1b$ and $1d$, from the degree-of-coupling memory 6. Subsequently, in step S5, the controller 5 calculates a current transmission capacity $C_{MIMO\_ad}$ using equation (21) from received power values based on the detected signal levels, and calculates a transmission capacity $C_{MIMO\_bd}$ assuming that the antenna elements used are changed from $1a$ and $1d$ to $1b$ and $1d$ (referred to as the "estimated transmission capacity") using equation (21) from estimated received powers based on the detected signal levels and the read degrees of coupling (see equations (21) to (25)). Then, in step S6, the controller 5 determines whether or not the estimated transmission capacity $C_{MIMO\_bd}$ is higher than the current transmission capacity $C_{MIMO\_ad}$. If YES then the process proceeds to step S7, and if NO then the process proceeds to step S12. In step S7, the controller 5 controls the switch circuit 2 to connect the antenna element $1b$, in place of the antenna element $1a$, to the MIMO modulator and demodulator circuit 3, and proceeds to step S12.

On the other hand, if NO in step S3, then in step S8, the controller 5 reads a degree of coupling $C_{em\_ad}$ between the antenna elements $1a$ and $1d$, and a degree of coupling $C_{em\_ac}$ between the antenna elements $1a$ and $1c$, from the degree-of-coupling memory 6. Subsequently, in step S9, the controller 5 calculates a current transmission capacity $C_{MIMO\_ad}$ using equation (21) from received power values based on the detected signal levels, and calculates a transmission capacity $C_{MIMO\_ac}$ assuming that the antenna elements used are changed from $1a$ and $1d$ to $1a$ and $1c$ (i.e., an estimated transmission capacity) using equation (21) from estimated received powers based on the detected signal levels and the read degrees of coupling (see equations (21) to (25)). Then, in step S10, the controller 5 determines whether or not the estimated transmission capacity $C_{MIMO\_ac}$ is higher than the current transmission capacity $C_{MIMO\_ad}$. If YES then the process proceeds to step S11, and if NO then the process proceeds to step S12. In step S11, the controller 5 controls the switch circuit 2 to connect the antenna element $1c$, in place of the antenna element $1d$, to the MIMO modulator and demodulator circuit 3, and proceeds to step S12.

The controller 5 maintains the state of the switch circuit 2 until it is determined in step S12 that detection clock time has elapsed. If the detection clock time has elapsed, then the process returns to step S1. With respect to step S12 in which the state of the switch circuit 2 is maintained until detection clock time has elapsed, the detection clock time should be set sufficiently longer than the change rate of fading caused by the surrounding environment and by the moving speed of a user. The clock time of pilot signals of received signals (e.g., 0.1 milliseconds) may be used as the detection clock time. More preferably, for example, time periods of about one second or more may be used as the detection clock time.

FIG. 8 is a flowchart showing an example of a second MIMO antenna control process performed by the controller 5 of FIG. 1. The process of FIG. 8 is characterized by being able to cope with also the case in which both of the antenna elements $1a$ and $1d$ are degraded due to the influence of fingers, in addition to performing the process of FIG. 7. Steps S21 to S23 in FIG. 8 are the same as steps S1 to S3 in FIG. 7, if YES in step S3 then the process proceeds to step S24, and if NO then the process proceeds to step S28. In step S24, the controller 5 reads a degree of coupling $C_{em\_ad}$ between the antenna elements $1a$ and $1d$, a degree of coupling $C_{em\_bd}$ between the antenna elements $1b$ and $1d$, and a degree of coupling $C_{em\_bc}$ between the antenna elements $1b$ and $1c$, from the degree-of-coupling memory 6. Subsequently, in step S25, the controller 5 calculates a current transmission capacity $C_{MIMO\_ad}$ using equation (21) from received power values based on detected signal levels, and calculates a transmission capacity $C_{MIMO\_bd}$ assuming that the antenna elements used are changed from $1a$ and $1d$ to $1b$ and $1d$ (i.e., an estimated transmission capacity) using equation (21) from estimated received powers based on detected signal levels and the read degrees of coupling $C_{em\_ad}$ and $C_{em\_bd}$, and further calculates a transmission capacity $C_{MIMO\_bc}$ assuming that the antenna elements used are changed from $1a$ and $1d$ to $1b$ and $1c$ (i.e., an estimated transmission capacity) using equation (21) from estimated received powers based on detected signal levels and the read degrees of coupling $C_{em\_rad}$ and $C_{em\_bc}$ (see equations (21) to (25)). In step S26, the controller 5 compares the calculated transmission capacities with each other. As a result of the comparison, if the current transmission capacity $C_{MIMO\_ad}$ is maximum, then the process proceeds to step S33; if the estimated transmission capacity $C_{MIMO\_bd}$ is maximum, then the process proceeds to step S27; and if the estimated transmission capacity $C_{MIMO\_bc}$ is maximum, then the process proceeds to step S32. In step S27, the controller 5 controls the switch circuit 2 to connect the antenna element $1b$, in place of the antenna element $1a$, to the MIMO modulator and demodulator circuit 3, and proceeds to step S33.

On the other hand, if NO in step S23, then in step S28, the controller 5 reads a degree of coupling $C_{em\_ad}$ between the antenna elements $1a$ and $1d$, a degree of coupling $C_{em\_ac}$ between the antenna elements $1a$ and $1c$, and a degree of coupling $C_{em\_bc}$ between the antenna elements $1b$ and $1c$, from the degree-of-coupling memory 6. Subsequently, in step S29, the controller 5 calculates a current transmission capacity $C_{MIMO\_ad}$ using equation (21) from received power values based on detected signal levels, and calculates a transmission capacity $C_{MIMO\_ac}$ assuming that the antenna elements used are changed from $1a$ and $1d$ to $1a$ and $1c$ (i.e., an estimated transmission capacity) using equation (21) from estimated received powers based on detected signal levels and the read degrees of coupling $C_{em\_ad}$ and $C_{em\_ac}$, and further calculates a transmission capacity $C_{MIMO\_bc}$ assuming that the antenna elements used are changed from $1a$ and $1d$ to $1b$ and $1c$ (i.e., an estimated transmission capacity) using equation (21) from estimated received powers based on detected signal levels and the read degrees of coupling $C_{em\_ad}$ and $C_{em\_bc}$ (see equations (21) to (25)). In step S30, the controller 5 compares the calculated transmission capacities with each other. As a result of the comparison, if the current transmission capacity $C_{MIMO\_ad}$ is maximum, then the process proceeds to step S33; if the estimated transmission capacity $C_{MIMO\_ac}$ is maximum, then the process proceeds to step S31; and if the estimated transmission capacity $C_{MIMO\_bc}$ is maximum, then the process proceeds to step S32. In step S31, the controller 5 controls the switch circuit 2 to connect the antenna element $1c$, in place of the antenna element $1d$, to the MIMO modulator and demodulator circuit 3, and proceeds to step S33.

In step S32, the controller 5 controls the switch circuit 2 to connect the antenna elements $1b$ and $1c$, in place of the antenna elements $1a$ and $1d$, to the MIMO modulator and demodulator circuit 3, and proceeds to step S33.

The controller 5 maintains the state of the switch circuit 2 until it is determined in step S33 that detection clock time has elapsed. If the detection clock time has elapsed, then the process returns to step S31.

As described above, according to the process of FIG. 8, even when both of the antenna elements $1a$ and $1d$ are degraded due to the influence of fingers, it is possible to control to select a combination of the antenna elements $1b$ and $1c$, by reading a degree of electromagnetic coupling between the antenna elements 1b and 1c (steps S24 and S28), calculating an estimated transmission capacity thereof (steps S25 and S29), and comparing the estimated transmission capacity with other transmission capacities (steps S26 and S30). Accordingly, it is possible to achieve high speed MIMO wireless communication as highly as possible.

In addition, when calculating MIMO transmission capacity by the controller 5, it is desirable from the point of view of reducing the computation complexity, for example, to employ a method of obtaining, in advance, relationships between received levels and transmission capacities, and relationships between the degrees of electromagnetic coupling and transmission capacities, and performing the calculations based on these relationships. In this case, the transmission capacities may be calculated using an approximate curve, or may be determined by setting intervals for the received level and the degree of electromagnetic coupling to be, e.g., every 1 dB, calculating transmission capacities for every 1 dB in advance, storing these transmission capacities in the degree-of-coupling memory 6, and retrieving these stored transmission capacities. Furthermore, it is also possible to directly calculate only a transmission capacity based on received levels, using equation (16) from received signals. In this case, although there is a drawback of increasing the computation complexity, it is advantageous to improve the accuracy in the calculation of transmission capacities.

Next, with reference to FIGS. 9 to 12, portable wireless communication apparatuses provided with MIMO antenna apparatuses according to modified preferred embodiments of the preferred embodiment of the present invention will be described below.

Figure 9:
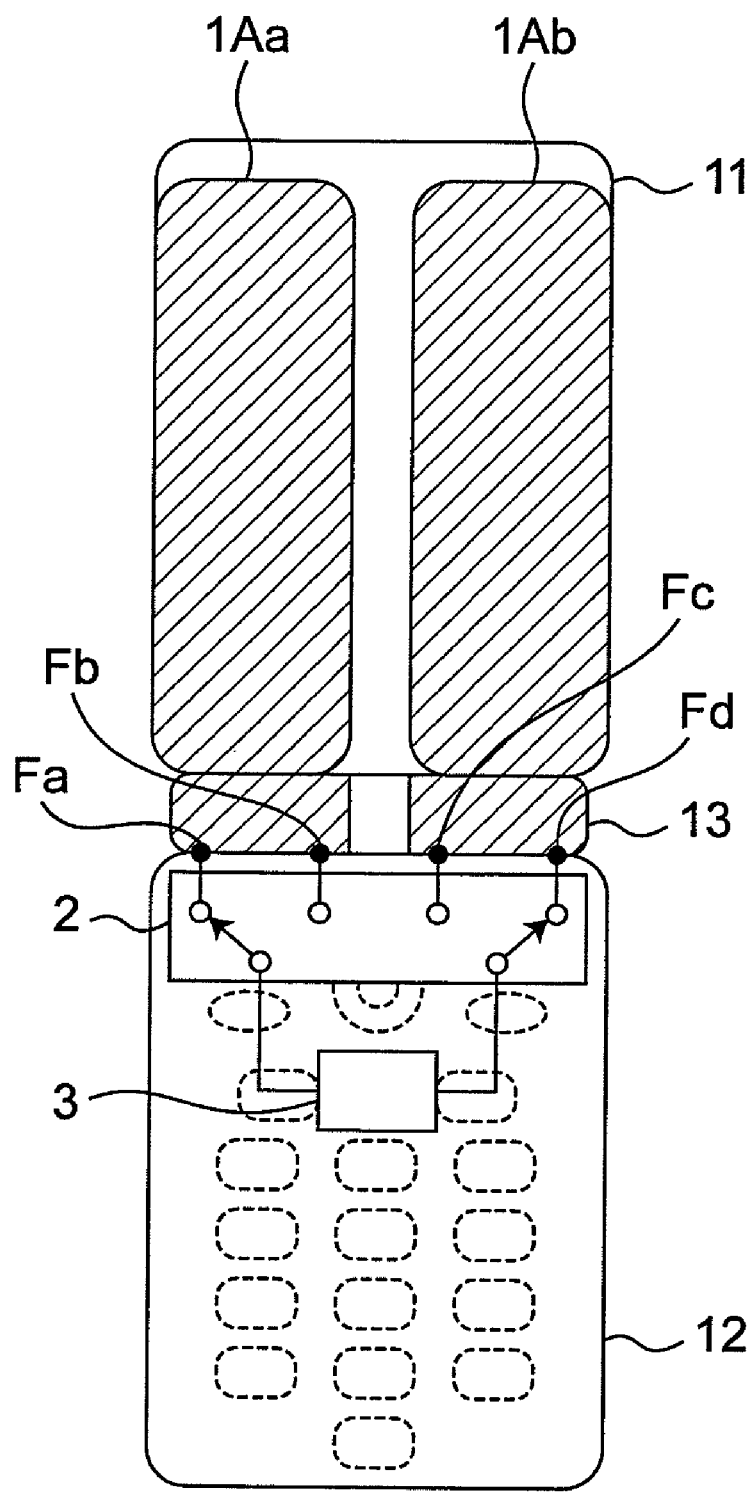
FIG. 9 is a transparent view showing an exemplary configuration of a portable wireless communication apparatus provided with a MIMO antenna apparatus, according to a first modified preferred embodiment of the preferred embodiment of the present invention.

FIG. 9 is a transparent view showing an exemplary configuration of a portable wireless communication apparatus provided with a MIMO antenna apparatus, according to a first modified preferred embodiment of the preferred embodiment of the present invention. The MIMO antenna apparatus according to the present preferred embodiment may be configured by providing at least one antenna element or each antenna element with a plurality of feeding points, and changing the feeding points for exciting the corresponding antenna elements, thus improving MIMO communication quality. The portable wireless communication apparatus of FIG. 9 is provided with, in place of the antenna elements 1a and 1b of FIG. 2, an antenna element 1Aa made of a strip conductor with a width wider than that of the antenna elements 1a and 1b, and provided with, in place of the antenna elements 1c and 1d, an antenna element 1Ab made of a strip conductor with a width wider than that of the antenna elements 1c and 1d. The antenna element 1Aa has feeding points Fa and Fb provided thereon and apart from each other by a certain distance, and the antenna element 1Ab has feeding points Fc and Fd provided thereon and apart from each other by a certain distance. A switch circuit 2 connects one of the feeding points Fa and Fb to a MIMO modulator and demodulator circuit 3, and connects one of the feeding points Fc and Fd to the MIMO modulator and demodulator circuit 3. In the present modified preferred embodiment, a degree-of-coupling memory 6 stores, in advance, degrees of electromagnetic coupling between the antenna elements 1Aa and 1Ab for each of possible combinations of the feeding points to be connected to the MIMO modulator and demodulator circuit 3 (i.e., for each combination of "Fa and Fd", "Fa and Fc", "Fb and Fd", and "Fb and Fc"). Further, in the present modified preferred embodiment, a controller 5 calculates a current transmission capacity based on signal levels detected by a signal level detector circuit 4; and calculates an estimated transmission capacity assuming that at least one of the feeding points of the antenna elements currently connected to the MIMO modulator and demodulator circuit 3 is changed to the other feeding point of the corresponding antenna element, based on the signal levels detected by the signal level detector circuit 4 and the degrees of electromagnetic coupling stored in the degree-of-coupling memory 6; and when the current transmission capacity becomes lower than the estimated transmission capacity, controls the switch circuit 2 to connect the other feeding point to the MIMO modulator and demodulator circuit 3. In the case of a small terminal apparatus such as a mobile phone, the size of antenna elements to be mounted is limited. However, according to the configuration of the present modified preferred embodiment, it is advantageous that the present invention can also be applied to a terminal apparatus with limited space.

Figure 10:
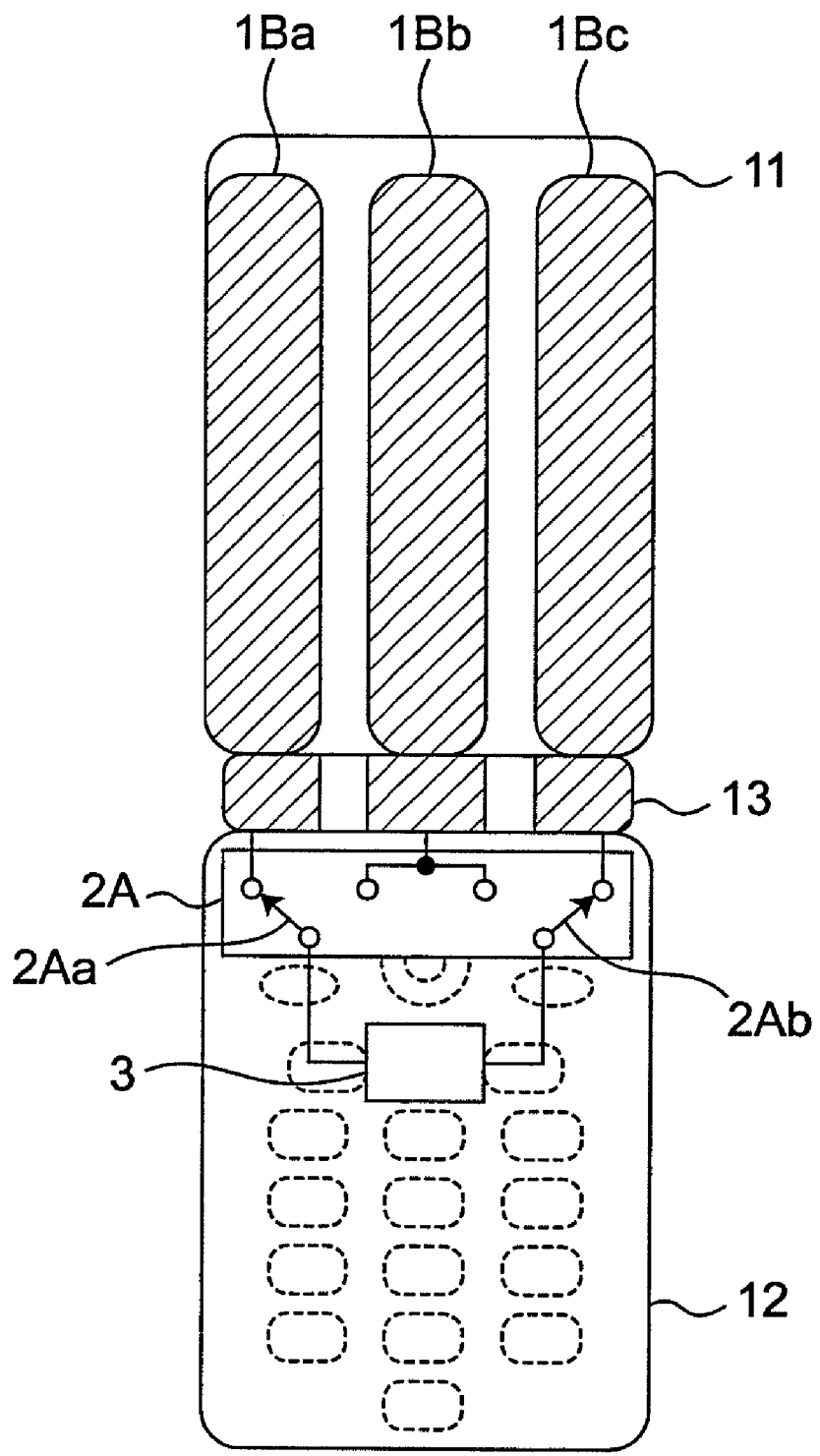
FIG. 10 is a transparent view showing an exemplary configuration of a portable wireless communication apparatus provided with a MIMO antenna apparatus, according to a second modified preferred embodiment of the preferred embodiment of the present invention.

FIG. 10 is a transparent view showing an exemplary configuration of a portable wireless communication apparatus provided with a MIMO antenna apparatus, according to a second modified preferred embodiment of the preferred embodiment of the present invention. The MIMO antenna apparatus according to the present preferred embodiment can also be configured by providing an inner antenna element with a plurality of feeding points, and changing these feeding points, thus improving MIMO communication performance. The portable wireless communication apparatus of FIG. 10 is provided with, in place of the antenna elements 1a, 1b, 1c, and 1d of FIG. 2, three antenna elements 1Ba, 1Bb, and 1Bc, each made of a strip conductor, and disposed in parallel with a longitudinal direction of the portable wireless communication apparatus, and disposed in line from left to right of an upper housing 11 with a certain spacing provided therebetween. The portable wireless communication apparatus of FIG. 10 is further provided with a switch circuit 2A, in place of the switch circuit 2 of FIG. 2. Each of the antenna elements 1Ba, 1Bb, and 1Bc is a monopole antenna. In the present modified preferred embodiment, the inner antenna element 1Bb operates as an antenna element with two feeding points, through the internal connection of the switch circuit 2A. Specifically, the switch circuit 2A connects one of the antenna elements 1Ba and 1Bb to the MIMO modulator and demodulator circuit 3, and connects one of the antenna elements 1Bb and 1Bc to the MIMO modulator and demodulator circuit 3. The antenna element 1Bb is not connected to the MIMO modulator and demodulator circuit 3 in its initial state, and is used as an auxiliary antenna element to be connected to the MIMO modulator and demodulator circuit 3 when a received signal at either of the antenna elements 1Bb and 1Bc is degraded, in place of the antenna element whose received signal is degraded. In the case of a small terminal apparatus such as a mobile phone, the size of antenna elements to be mounted is limited. However, according to the configuration of the present modified preferred embodiment, it is advantageous that the present invention can also be applied to a terminal apparatus with limited space. Furthermore, according to the modified preferred embodiment of FIG. 10, since an antenna element can be changed to another antenna element when a received signal is degraded, it is possible to control to improve MIMO communication quality even when entire antenna elements are covered, unlike the modified preferred embodiment of FIG. 9.

Figure 11:
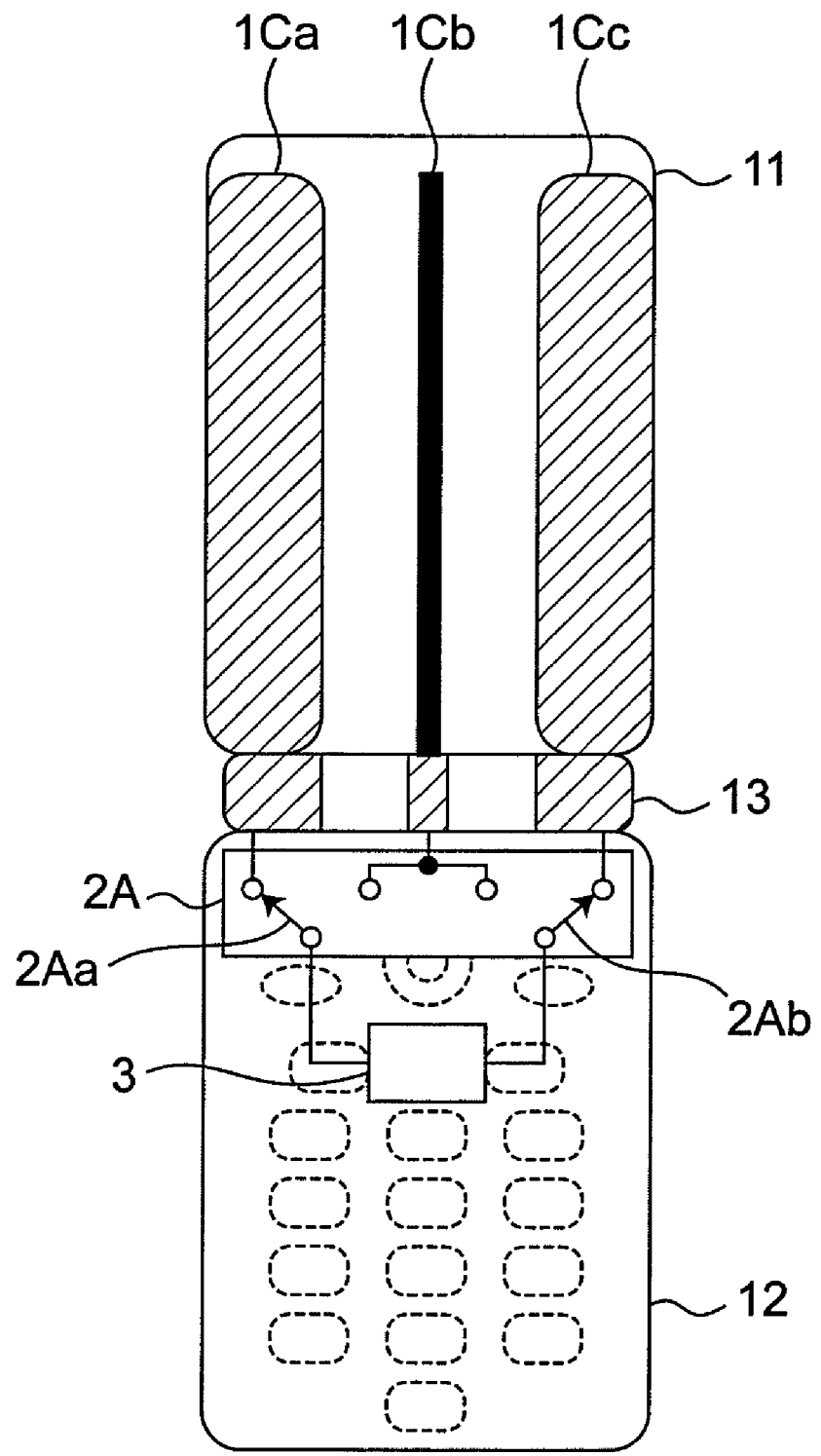
FIG. 11 is a transparent view showing an exemplary configuration of a portable wireless communication apparatus provided with a MIMO antenna apparatus, according to a third modified preferred embodiment of the preferred embodiment of the present invention.

In the above described preferred embodiments, the examples are described in which each MIMO antenna apparatus is configured by using a plurality of antenna elements of the same type. However, the MIMO antenna apparatus is not limited to such configurations, and may include at least two types of antenna elements using different excitation methods. FIG. 11 is a transparent view showing an exemplary configuration of a portable wireless communication apparatus provided with a MIMO antenna apparatus, according to a third modified preferred embodiment of the preferred embodiment of the present invention. The portable wireless communication apparatus according to the present modified preferred embodiment is provided with antenna elements 1Ca and 1Cc of the same type as the antenna elements 1Ba and 1Bc of FIG. 10, and provided with a slot antenna 1Cb provided between the antenna elements 1Ca and 1Cc. In other words, the configuration of the present modified preferred embodiment is characterized by including a slot antenna in place of the inner antenna element 1Bb of FIG. 10. The slot antenna 1Cb is configured by, for example, forming a slot pattern in a substrate (not shown) within the portable wireless communication apparatus, or providing a slot in an upper housing 11 made of a conductor. The slot antenna 1Cb can be fed through a feeder line or strip line (not shown) connected to a certain position on the slot antenna 1Cb. The antenna elements 1Ca and 1Cc are preferably provided on a far side from a user during talking, with respect to the position of the substrate or the upper housing 11 in which the slot pattern is formed. According to the present modified preferred embodiment, the antenna element 1Ca and the slot antenna 1Cb have different polarization characteristics, and the antenna element 1Cc and the slot antenna 1Cb have different polarization characteristics, and thus, the electromagnetic couplings and correlations between the antennas are further reduced, and the independency between the antennas is further improved, as compared to the cases of FIGS. 9 and 10. Accordingly, while maintaining a low correlation between the antennas, it is possible to further improve MIMO communication quality by changing an antenna to another antenna with a different polarization characteristic when a received signal is degraded.

Figure 13:
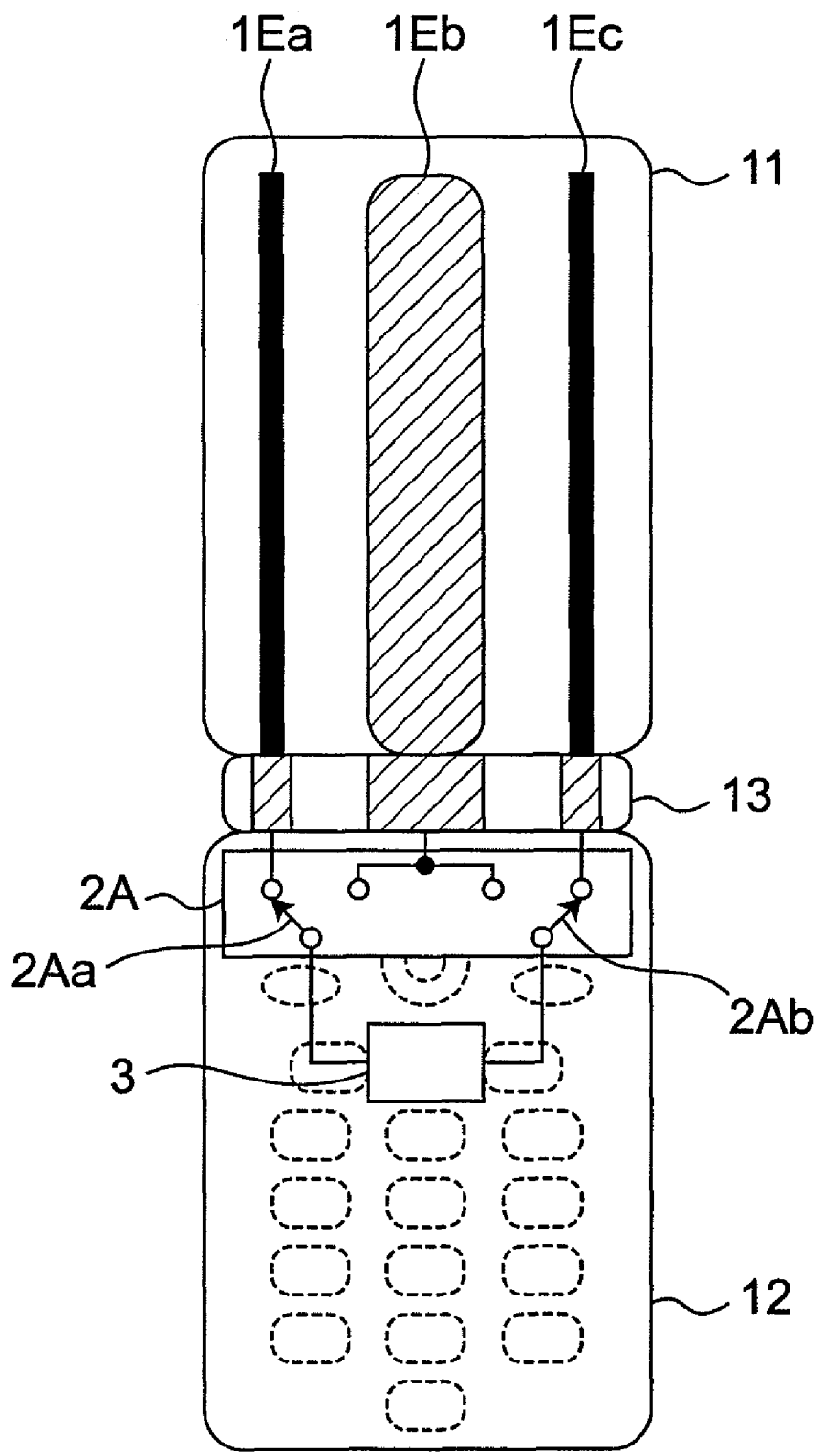
FIG. 13 is a transparent view showing an exemplary configuration of a portable wireless communication apparatus provided with a MIMO antenna apparatus, according to a fifth modified preferred embodiment of the preferred embodiment of the present invention.

In the modified preferred embodiment of FIG. 11, the outer antenna elements (i.e., antenna elements that are most distanced from each other) 1Ca and 1Cc are configured as monopole antennas, and an inner antenna element located between these antenna elements is configured as the slot antenna 1Cb. Alternatively, as shown in FIG. 13, the outer antenna elements 1Ea and 1Ec may be configured as slot antennas, and the inner antenna element 1Eb may be configured as a monopole antenna.

Figure 12:
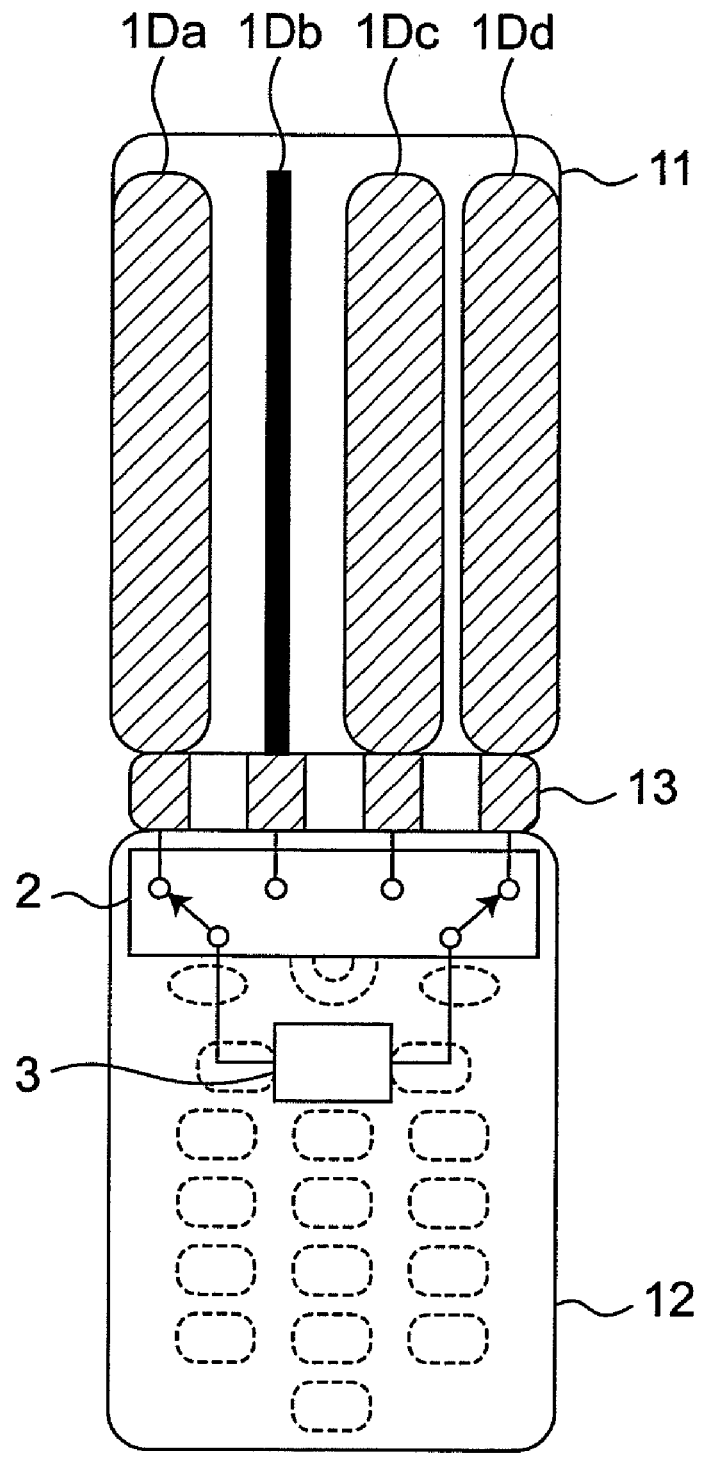
FIG. 12 is a transparent view showing an exemplary configuration of a portable wireless communication apparatus provided with a MIMO antenna apparatus, according to a fourth modified preferred embodiment of the preferred embodiment of the present invention.

FIG. 12 is a transparent view showing an exemplary configuration of a portable wireless communication apparatus provided with a MIMO antenna apparatus, according to a fourth modified preferred embodiment of the preferred embodiment of the present invention. The portable wireless communication apparatus according to the present modified preferred embodiment is provided with antenna elements 1Da, 1Dc, and 1Dd of the same type as the antenna elements 1a, 1c, and 1d of FIG. 2, and provided with a slot antenna 1Db provided between the antenna elements 1Da and 1Dc. That is, the configuration of the present modified preferred embodiment is characterized by including a slot antenna in place of the inner antenna element 1b of FIG. 2, and thus, characterized in that the inner antenna elements 1Db and 1Dc located between the outer antenna elements (antenna elements that are most distanced from each other) 1Da and 1Dd include at least two types of antenna elements with different excitation methods (i.e., a monopole antenna and a slot antenna). According to the present modified preferred embodiment, similarly to the modified preferred embodiment of FIG. 11, the antenna element 1Da and the slot antenna 1Db have different polarization characteristics, and the antenna element 1Dc and the slot antenna 1Db have different polarization characteristics, and thus, the electromagnetic couplings and correlations among the antennas are further reduced, and the independencies among the antennas are further improved, as compared to the case of FIG. 2. Accordingly, while maintaining low correlations among the antennas, it is possible to further improve MIMO communication quality by changing an antenna to another antenna with a different polarization characteristic when a received signal is degraded. Furthermore, since the slot antenna 1Db uses an excitation method different from that of the antenna element 1Dc and thus the degree of electromagnetic coupling between the antennas is reduced, it is possible to achieve good MIMO communication quality, even when both of the antenna elements 1Da and 1Dd are degraded during the process of FIG. 8, and accordingly, a combination of the antenna elements 1Db and 1Dc is selected in step S32.

Furthermore, in the control process, it is possible to select antennas with a lower degree of electromagnetic coupling by selecting antenna elements with a longer distance between them, when turning on the power to the MIMO antenna apparatus according to the present preferred embodiment, or when starting MIMO communication. Thus, it is expected to select a combination with better MIMO communication quality as an initial state.

Furthermore, in the control process, it is also possible to search antenna elements so as to select a combination with the highest transmission capacity, when turning on the power to the MIMO antenna apparatus. This is achieved as follows. First, the signal level detector circuit 4 obtains signal levels of received signals at all antenna elements. Then, based on the obtained signal levels and degrees of electromagnetic coupling stored in the degree-of-coupling memory 6, the controller 5 calculates estimated transmission capacities for all possible combinations of antenna elements to be connected to the MIMO modulator and demodulator circuit 3 (see equations (21) to (25)), and then, selects a combination of antenna elements achieving the highest transmission capacity, as an initial state. Thus, it is possible to always optimize a combination of antenna elements in an initial state.

Furthermore, in the control process, it is also possible to record history information on combinations of antenna elements selected when turning on the power to the MIMO antenna apparatus on or when starting MIMO communication, in the history-information memory 5a within the controller 5, and to select, as an initial state, a combination of antenna elements that is the most frequently selected. This increases the probability of selecting an optimal antenna combination when starting MIMO communication.

Furthermore, in the control process, it is also possible to record a plurality of combinations of antenna elements for when starting MIMO communication, for each application, in the history-information memory 5a within the controller 5, and to select a combination of antenna elements that is most frequently selected for an application to be used. For example, in the case that the portable wireless communication apparatus is a mobile phone, the mobile phone is held close to the head of the human body during talking, and on the other hand, the mobile phone is held in front of the human body when using multimedia contents such as the Internet, a game, or a television receiver. Accordingly, the posture of holding the mobile phone varies depending on the application to be used. That is, by controlling to select a combination of antenna elements that is most frequently selected, for each of the applications, it is advantageous to increase the probability of selecting an optimal antenna combination.

Furthermore, it is also possible to determine antenna elements to be selected, during MIMO reception, and to reselect, during MIMO transmission, the antenna elements determined during the reception. When performing a MIMO transmission operation from an initial state, outer antenna elements are selected, and when performing the first MIMO transmission operation after a MIMO reception operation, the same antenna elements as those used during MIMO reception are selected. Thus, it is advantageous to achieve good quality during MIMO transmission.

Furthermore, the signal level detector circuit 4 may include an analog/digital converter circuit for baseband signals, and may use a control voltage RSSI of a fast analog/digital converter circuit or an AGC (Automatic Gain Control) for radio frequencies in a RF or IF band.

As described above, according to the MIMO antenna apparatus according to the present preferred embodiment, it is possible to increase the transmission rate by employing the configuration in which a plurality of antenna elements are changed according to transmission capacities calculated from signal levels of received signals and degrees of electromagnetic coupling. Furthermore, it is possible to provide a MIMO antenna apparatus in a small size, capable of maintaining receiving conditions in which radio signals respectively received by a plurality of antenna elements have high received powers, with small differences among the received powers, and with low electromagnetic coupling, thus achieving MIMO communication with high transmission capacity and high transmission quality.

As described above, although the present invention is described in detail with reference to preferred embodiments, the present invention is not limited to such embodiments. It will be obvious to those skilled in the art that numerous modified preferred embodiments and altered preferred embodiments are possible within the technical scope of the present invention as defined in the following appended claims.

What is claimed is:

1. A MIMO antenna apparatus comprising at least three antenna elements for respectively receiving radio signals, and a demodulator circuit for demodulating radio signals received through at least two of the antenna elements by using a MIMO (Multi-Input Multi-Output) scheme, the apparatus comprising:
   a detector circuit for detecting received-signal levels of the respective radio signals received by the respective antenna elements;
   a switch circuit for connecting at least two of the antenna elements to the demodulator circuit;
   a degree-of-coupling memory for storing, in advance, degrees of electromagnetic coupling among the at least three antenna elements; and
   a controller for controlling the switch circuit based on the received-signal levels detected by the detector circuit and the degrees of electromagnetic coupling stored in the degree-of-coupling memory,
   wherein the controller calculates a current transmission capacity based on the received-signal levels detected by the detector circuit; calculates an estimated transmission capacity assuming that at least one of the antenna elements currently connected to the demodulator circuit is changed to a further antenna element not connected to the demodulator circuit, based on the received-signal levels detected by the detector circuit and the degrees of electromagnetic coupling stored in the degree-of-coupling memory; and when the current transmission capacity becomes lower than the estimated transmission capacity, controls the switch circuit to connect the further antenna element to the demodulator circuit.

2. The MIMO antenna apparatus as claimed in claim 1,
   wherein the at least three antenna elements include one auxiliary antenna element that is not connected to the demodulator circuit in an initial state thereof, and
   wherein the controller calculates an estimated transmission capacity assuming that any one of the antenna elements currently connected to the demodulator circuit is changed to the auxiliary antenna element; and when the current transmission capacity becomes lower than the estimated transmission capacity, controls the switch circuit to connect the auxiliary antenna element to the demodulator circuit.

3. The MIMO antenna apparatus as claimed in claim 1,
   wherein the at least three antenna elements include at least two different types of antenna elements.

4. The MIMO antenna apparatus as claimed in claim 3,
   wherein the at least three antenna elements include a monopole antenna and a slot antenna.

5. The MIMO antenna apparatus as claimed in claim 3,
   wherein two of the at least three antenna elements, that are most distanced from each other, are monopole antennas, and the other antenna element is a slot antenna.

6. The MIMO antenna apparatus as claimed in claim 3,
   wherein two of the at least three antenna elements, that are most distanced from each other, are slot antennas, and the other antenna element is a monopole antenna.

7. The MIMO antenna apparatus as claimed in claim 3,
   wherein the MIMO antenna apparatus comprises at least four antenna elements, and
   wherein inner antenna elements, located between two of the at least four antenna elements that are most distanced from each other, include at least two different types of antenna elements.

8. The MIMO antenna apparatus as claimed in claim 7,
   wherein the inner antenna elements include a monopole antenna and a slot antenna.

9. The MIMO antenna apparatus as claimed in claim 1,
   wherein when turning on the power to the MIMO antenna apparatus, or when starting MIMO communication, the controller controls the switch circuit to connect two of the at least three antenna elements, that are most distanced from each other, to the demodulator circuit.

10. The MIMO antenna apparatus as claimed in claim 1,
    wherein when turning on the power to the MIMO antenna apparatus, on or when starting MIMO communication, the controller calculates estimated transmission capacities for all possible combinations of antenna elements to be connected to the demodulator circuit, based on the received-signal levels detected by the detector circuit and the degrees of electromagnetic coupling stored in the degree-of-coupling memory; selects a combination of antenna elements achieving the highest transmission capacity; and controls the switch circuit to connect the selected combination of antenna elements to the demodulator circuit.

11. The MIMO antenna apparatus as claimed in claim 10,
    wherein the controller records history information on combinations of antenna elements selected when turning on the power to the MIMO antenna apparatus; selects a combination of antenna elements that is most frequently selected; and controls the switch circuit to connect the selected combination of antenna elements to the demodulator circuit.

12. The MIMO antenna apparatus as claimed in claim 10,
    wherein the controller records history information on combinations of antenna elements selected when starting MIMO communication; selects a combination of antenna elements that is most frequently selected; and controls the switch circuit to connect the selected combination of antenna elements to the demodulator circuit.

13. The MIMO antenna apparatus as claimed in claim 10, wherein the controller records history information on combinations of antenna elements selected when starting MIMO communication, for each application; selects a combination of antenna elements that is most frequently selected for an application to be used; and controls the switch circuit to connect the selected combination of antenna elements to the demodulator circuit.

14. The MIMO antenna apparatus as claimed in claim 1, wherein in every detection clock time, the controller calculates the current transmission capacity and the estimated transmission capacity, and when the current transmission capacity becomes lower than the estimated transmission capacity, controls the switch circuit to connect the further antenna element to the demodulator circuit.

15. The MIMO antenna apparatus as claimed in claim 14, wherein the detection clock time is determined by a pilot signal of the received radio signals.

16. The MIMO antenna apparatus as claimed in claim 1, wherein the demodulator circuit is a modulator and demodulator circuit for further generating radio signals modulated by a MIMO scheme, and
wherein when transmitting the radio signals, the controller controls the switch circuit to connect those antenna elements used when receiving radio signals, among the at least three antenna elements, to the modulator and demodulator circuit.

17. A MIMO antenna apparatus comprising at least two antenna elements each having a plurality of feeding points and receiving radio signals, and a demodulator circuit for demodulating radio signals received through the at least two antenna elements by using a MIMO (Multi-Input Multi-Output) scheme, the apparatus comprising:
  a detector circuit for detecting received-signal levels of the respective radio signals received by the respective antenna elements;
  a switch circuit for connecting one of the feeding points on each of the antenna elements, to the demodulator circuit, respectively;
  a degree-of-coupling memory for storing, in advance, degrees of electromagnetic coupling between the at least two antenna elements, for respective possible combinations of the feeding points to be connected to the demodulator circuit; and
  a controller for controlling the switch circuit based on the received-signal levels detected by the detector circuit and the degrees of electromagnetic coupling stored in the degree-of-coupling memory,
  wherein the controller calculates a current transmission capacity based on the received-signal levels detected by the detector circuit; calculates an estimated transmission capacity assuming that at least one of the feeding points of the antenna elements currently connected to the demodulator circuit is changed to a further feeding point of the same antenna element, based on the received-signal levels detected by the detector circuit and the degrees of electromagnetic coupling stored in the degree-of-coupling memory; and when the current transmission capacity becomes lower than the estimated transmission capacity, controls the switch circuit to connect the further feeding point to the demodulator circuit.

18. A wireless communication apparatus comprising a MIMO antenna apparatus, the MIMO antenna apparatus comprising:
  at least three antenna elements for respectively receiving radio signals;
  a demodulator circuit for demodulating radio signals received through at least two of the antenna elements by using a MIMO (Multi-Input Multi-Output) scheme;
  a detector circuit for detecting received-signal levels of the respective radio signals received by the respective antenna elements;
  a switch circuit for connecting at least two of the antenna elements to the demodulator circuit;
  a degree-of-coupling memory for storing, in advance, degrees of electromagnetic coupling among the at least three antenna elements; and
  a controller for controlling the switch circuit based on the received-signal levels detected by the detector circuit and the degrees of electromagnetic coupling stored in the degree-of-coupling memory,
  wherein the controller calculates a current transmission capacity based on the received-signal levels detected by the detector circuit; calculates an estimated transmission capacity assuming that at least one of the antenna elements currently connected to the demodulator circuit is changed to a further antenna element not connected to the demodulator circuit, based on the received-signal levels detected by the detector circuit and the degrees of electromagnetic coupling stored in the degree-of-coupling memory; and when the current transmission capacity becomes lower than the estimated transmission capacity, controls the switch circuit to connect the further antenna element to the demodulator circuit.

19. A wireless communication apparatus comprising a MIMO antenna apparatus, the MIMO antenna apparatus comprising:
  at least two antenna elements each having a plurality of feeding points and receiving radio signals;
  a demodulator circuit for demodulating radio signals received through the at least two antenna elements by using a MIMO (Multi-Input Multi-Output) scheme;
  a detector circuit for detecting received-signal levels of the respective radio signals received by the respective antenna elements;
  a switch circuit for connecting one of the feeding points on each of the antenna elements, to the demodulator circuit, respectively;
  a degree-of-coupling memory for storing, in advance, degrees of electromagnetic coupling between the at least two antenna elements, for respective possible combinations of the feeding points to be connected to the demodulator circuit; and
  a controller for controlling the switch circuit based on the received-signal levels detected by the detector circuit and the degrees of electromagnetic coupling stored in the degree-of-coupling memory,
  wherein the controller calculates a current transmission capacity based on the received-signal levels detected by the detector circuit; calculates an estimated transmission capacity assuming that at least one of the feeding points of the antenna elements currently connected to the demodulator circuit is changed to a further feeding point of the same antenna element, based on the received-signal levels detected by the detector circuit and the degrees of electromagnetic coupling stored in the degree-of-coupling memory; and when the current transmission capacity becomes lower than the estimated transmission capacity, controls the switch circuit to connect the further feeding point to the demodulator circuit.

* * * * *